US010740722B2

(12) United States Patent
Gerace et al.

(10) Patent No.: US 10,740,722 B2
(45) Date of Patent: Aug. 11, 2020

(54) USER-DRIVEN MEDIA SYSTEM IN A COMPUTER NETWORK

(75) Inventors: Thomas A. Gerace, Boston, MA (US); Russell G. Barbour, Natick, MA (US)

(73) Assignee: SKYWORD INC., Boston, MA (US)

(*) Notice: Subject to any disclaimer, the term of this patent is extended or adjusted under 35 U.S.C. 154(b) by 2636 days.

(21) Appl. No.: 11/371,462

(22) Filed: Mar. 9, 2006

(65) Prior Publication Data

US 2006/0242554 A1    Oct. 26, 2006

Related U.S. Application Data

(60) Provisional application No. 60/674,606, filed on Apr. 25, 2005, provisional application No. 60/690,005, filed on Jun. 13, 2005, provisional application No. 60/734,690, filed on Nov. 8, 2005.

(51) Int. Cl.
| | |
|---|---|
| *G06Q 10/00* | (2012.01) |
| *G06Q 30/00* | (2012.01) |
| *G06Q 10/10* | (2012.01) |
| *G06Q 30/02* | (2012.01) |
| *G06F 16/9535* | (2019.01) |

(52) U.S. Cl.
CPC ......... *G06Q 10/10* (2013.01); *G06F 16/9535* (2019.01); *G06Q 30/02* (2013.01); *G06Q 30/0218* (2013.01); *G06Q 30/0225* (2013.01); *G06Q 30/0246* (2013.01); *G06Q 30/0254* (2013.01)

(58) Field of Classification Search
None
See application file for complete search history.

(56) References Cited

U.S. PATENT DOCUMENTS

| | | | |
|---|---|---|---|
| 5,553,218 A * | 9/1996 | Li | G06F 16/284 |
| 5,960,429 A * | 9/1999 | Peercy | G06F 16/951 |
| | | | 709/217 |
| 5,974,398 A | 10/1999 | Hanson et al. | |

(Continued)

FOREIGN PATENT DOCUMENTS

| | | |
|---|---|---|
| CA | 2 605 995 A1 | 11/2006 |
| WO | WO 01/80039 A2 | 10/2001 |

(Continued)

OTHER PUBLICATIONS

Yang et al., Image Retrieval and Relevance Feedback Using Peer Indexing, 2002, IEEE (Year: 2002).*

(Continued)

*Primary Examiner* — Naresh Vig
(74) *Attorney, Agent, or Firm* — Hamilton, Brook, Smith & Reynolds, P.C.

(57) ABSTRACT

A global computer network system includes a method and apparatus for writer compensation, a method and apparatus for reader rating and a method and apparatus for enabling readers to tip an author. The system further provides content organization according to user relationship and website community. Another feature effects content browsing by relationship of users in the system. The system provides determination of content scarcity and advertisement (ad inventory) scarcity. The system also includes user-specified comments or reader indications on system contents such as authored works and bookmarks.

22 Claims, 27 Drawing Sheets

(56) References Cited

U.S. PATENT DOCUMENTS

| | | | |
|---|---|---|---|
| 6,175,831 B1 | 1/2001 | Weinreich et al. | |
| 6,275,811 B1* | 8/2001 | Ginn | 705/10 |
| 6,411,950 B1 | 6/2002 | Moricz et al. | |
| 6,778,982 B1 | 8/2004 | Knight et al. | |
| 7,143,089 B2* | 11/2006 | Petras et al. | 707/749 |
| 7,395,499 B2 | 7/2008 | Lane et al. | |
| 7,614,081 B2* | 11/2009 | Prohel | H04L 63/0428 |
| | | | 709/223 |
| 7,797,345 B1* | 9/2010 | Martino | G06F 17/30867 |
| | | | 707/792 |
| 8,250,065 B1* | 8/2012 | Chambers | G06F 16/954 |
| | | | 707/723 |
| 8,370,203 B2* | 2/2013 | Dicker | G06Q 30/02 |
| | | | 705/14.53 |
| 2001/0047290 A1 | 11/2001 | Petras et al. | |
| 2002/0046281 A1* | 4/2002 | Cope | G06F 11/3476 |
| | | | 709/227 |
| 2002/0059201 A1* | 5/2002 | Work | 707/3 |
| 2002/0147710 A1 | 10/2002 | Hu | |
| 2002/0169782 A1 | 11/2002 | Lehmann et al. | |
| 2003/0154248 A1 | 8/2003 | Smith et al. | |
| 2004/0103024 A1 | 5/2004 | Patel et al. | |
| 2004/0199527 A1* | 10/2004 | Morain | G06F 21/10 |
| 2005/0021750 A1 | 1/2005 | Abrams | |
| 2005/0028188 A1* | 2/2005 | Latona | G06Q 30/02 |
| | | | 725/13 |
| 2005/0131762 A1 | 6/2005 | Bharat et al. | |
| 2005/0131894 A1 | 6/2005 | Vuong | |
| 2005/0171832 A1 | 8/2005 | Hull et al. | |
| 2005/0201290 A1 | 9/2005 | Vasudev et al. | |
| 2005/0203801 A1* | 9/2005 | Morgenstern et al. | 705/14 |
| 2005/0203809 A1 | 9/2005 | Stone et al. | |
| 2006/0095281 A1 | 5/2006 | Chickering et al. | |
| 2006/0143068 A1 | 6/2006 | Calabria | |
| 2006/0200435 A1* | 9/2006 | Flinn | G06N 99/005 |
| | | | 706/12 |
| 2006/0212355 A1 | 9/2006 | Teague et al. | |
| 2006/0282328 A1 | 12/2006 | Gerace et al. | |
| 2006/0287916 A1* | 12/2006 | Starr | G06Q 30/02 |
| | | | 705/14.46 |
| 2007/0043583 A1* | 2/2007 | Davulcu | G06F 17/30864 |
| | | | 705/1.1 |
| 2008/0162260 A1 | 7/2008 | Rohan et al. | |

FOREIGN PATENT DOCUMENTS

| | | |
|---|---|---|
| WO | WO 2005/006152 | 1/2005 |
| WO | WO 2006/135920 A2 | 12/2006 |

OTHER PUBLICATIONS

Gnawali, A keyword-set Search System for Peer-to-Peer Networks, Jun. 2002, Massachusetts Institute of Technology (Year: 2002).*

XP002441767 [online] Retrieved from the Internet URL: http://www.archive.org/web/20051001143 606/http://www.youtube.com [retrieved on Oct. 1, 2005].

International Search Report from PCT/US06/14582 filed on Apr. 19, 2006.

Green, Heather. "Making Social Networks Profitable: Google's new approach could offer advertisers coveted online communities," *BusinessWeek*, Sep. 25, 2008 [retrieved on Sep. 30, 2008]. Retrieved from the Internet URL: http://www.businessweek.com/print/magazine/content/08_40/b4102050681705.htm.

Egan, R., "The Secrets of Real-Time Search Success," *iMedia Connection* [online], Feb. 9, 2010, [retrieved on Feb. 10, 2010]. Retrieved from the Internet URL: http://www.imediaconnection.com/printpage/printpage.aspx?id=25877.

Extended European Search Report, Application No. 06784855.6, dated May 4, 2010.

Office Action, Application No. CA 2,611,974, "Computer Method and Apparatus for Targeting Advertising", dated Feb. 18, 2015.

* cited by examiner

| Home Feedback Help Sign Out | Browse | Publish | Connect | My Content | My Network | My Info |

Tags ⊙ Suggested ○ Most Viewed ○ Most Discussed ○ Most Published
gather.com/...arts, books, business, education, environment, family, food 🔍 | Search Articles | → | About search

Edit Your Group Settings
Manage and edit your group details, settings, and permission any time you wish. Update the necessary information below. The only information that cannot be updated is group username.

Group Setting, Part I  ⟵ 112

Group Name: Car Guys
* Group Username carguys.gather.com. Group username cannot be changed.
City: Detroit    State: MI
Tags: speed, suv, cars, porsche, truck, wheels, automobile
* Synopsis: Where car guys go to talk about cars.
Description: A forum to share your knowledge and expertise of cars with others. Share stories about trips and what your dreams are and why.
Group icon 👥 (Choose File) no file selected No Capitals, Spaces, symbols, or underscore. Up to 16 numbers or lowercase letters. The name you choose for your group will become your group homepage URL: namepace.gather.com.

Separate words and phrases with commas. Tags function as keywords that allow your group to be found by someone performing a search.

255 character maximum. This short description will display when someone searches for your group.

Group Setting, Part II  ⟵ 114

This group can be seen by ⊙ Everyone ○ Group Members Only
This group's content can be viewed by ⊙ Everyone ○ Group Members Only
This group's content is moderated ○ Yes ⊙ No
People who want to join this group will ⊙ Be automatically added as members
○ Be reviewed by a moderator before acceptance
⟵ 116   ○ Need to be invited by a member 6000 character maximum. This longer description will appear on your group's About page.

JPG only. Browse your computer to upload an icon that represents your group.

Set permissions for viewing and joining.

Default Member Permissions (by detail the group owner can do all of these things)
☑ Can post to the group
☑ Can publish using the group name
☐ Can moderate content
☐ Can moderate members
☑ Can invite others
☐ Can message the entire group Set permissions for publishing, content, invitations, member moderation, and messaging.

Adult Group Setting
If your group involves subject matter that can be described as adult content, on their Gather pages.
☐ Nudity ☐ Other
* = required field    SUBMIT

FIG. 2G

[View▼] [Publish▼] [Connect▼ 18 New] [Communicate▼ 3 Messages] [My Content▼] [My Profile▼] [My Points▼ 05 375]

Welcome, Tommy! Account Settings | Logout

Search [Gather ▼] for [Blogging] [Go]   April 21, 2005

Publish An Article: Create

Lorem ipsum dolor sit amet, consecteteur adipiscing elit. Duis bibendum, quam a euismod dignissim, est facilisis tortor, eget eleifend orci ipsum tristique odio.

Step 1: Create   Step 2: Categorize   Step 3: Viewing Options

Publish
▸ Article
Review
Photo
Audio/Podcasts
Files

Sponsored Links

More Than a Blog [more]
A revolutionary new way to publish your stuff on the web.
www.squarespace.com Blogs for Young People [more]
Get a free blog and share your adventures and life with the world!
www.tigblog.org Make Money Blogging [more]
Learn How to Make Money With a Blog in This Crash Course.
SuccessBlog.biz Free Blogs at Blogster [more]
Community blogging
2 minutes to your own blog.
www.blogster.com Start Your Free Blog [more]
Blog for free. Over 25 templates to choose from. Start your blog today
www.journalhome.com Free Blog [more]
Create Your Own Blog - It's Free Post, Publish, Get Feedback.
www.MyBlogSite.com Today's Blogs [more]
What are The Bloggers Saying Today? The Latest On The Web.
www.state.com Blogging [more]
Powerful and easy to use.
Includes 1 GB of space, domain, & email.
www.blogidentity.com Ads I've Seen Recently >>
Your Ads Here >>

Title  — 40
[Maecenas Lacus Magna]
— 49
B / U S A▼ | sis tortor, eget eleifend orci ipsum tristique odio. Maecenas lacus magna, sodales varius, dictum vulputate id, consectetuer tincidunt, mollis nec, turpis. Sed sapien pede, aliquam eget, iaculis nec ☑ This article contains content intended for mature audiences What's This?  — 29

Which type:
☑ Contains violence
☑ Is sexual in nature
☐ Is sexually explicit
☐ Contains crude/indecent language
☑ Photo contains nudity
☑ Photo is violent

[NEXT]  [SAVE AS A DRAFT]

[View ▼] [Publish ▼] [Connect ▼ 18 New] [Communicate ▼ 3 Messages] [My Content ▼] [My Profile ▼] [My Points ▼ 05 375]

Welcome, Tommy! Account Settings | Logout

Search [Gather ▼] for [Blogging] [Go]     April 21, 2005

Search Results ⟵ 43
1 - 10 of about 15,920 in [Gather] for blogging
Page 1 | 2 | 3 | 4 | 5 | next

| View All 15,920 Results | Articles 14,900 Results | Members 650 Results | Messages 350 Results | Groups 20 Results | Files 4 Results | [X] |

○ View All Article    ⊙ Refine Search Results in Articles

Filter Article By:          Sort By:
[Author ▼]                  [A - Z ▼]

Custom Date Range:
[Last 30 Days ▼]

[03/23/05] 📅 Thu    [04/25/05] 📅 Fri

[SEARCH]  [CANCEL]

Scotland, Northern Ireland and the Channel... ⟵ 63
www.bloggingbrits.co.uk/ - [Read More] [Similar Results]
10. Blogging Brits Ring March 28, 2005 7:02a ET, By UserName, Rank:
Quality 8.5; Popularity 9;
Keywords: lacinia, metus, luctus;
Category: Travel / Domestic / City Stays
Primary you should also be resident, or have been born, somewhere in the United Kingdom - England, Wales, Scotland, Northern Ireland and the Channel...
www.bloggingbrits.co.uk/ - [Read More] [Similar Results]

Page 1 | 2 | 3 | 4 | 5 | next

Sponsored Links

More Than a Blog [more]
A revolutionary new way to publish your stuff on the web.
www.squarespace.com Blogs for Young People [more]
Get a free blog and share your adventures and life with the world!
www.tigblog.org Make Money Blogging [more]
Learn How to Make Money With a Blog in This Crash Course.
SuccessBlog.biz Free Blogs at Blogster [more]
Community blogging
2 minutes to your own blog.
www.blogster.com Start Your Free Blog [more]
Blog for free. Over 25 templates to choose from. Start your blog today
www.journalhome.com Free Blog [more]
Create Your Own Blog - It's Free Post, Publish, Get Feedback.
www.MyBlogSite.com Today's Blogs [more]
What are The Bloggers Saying Today? The Latest On The Web.
www.state.com Blogging [more]
Powerful and easy to use. Includes 1 GB of space, domain, & email.
www.blogidentity.com Ads I've Seen Recently >>
Your Ads Here >>

FIG. 4D

| View ▼ | Publish ▼ | Connect ▼ 18 New | Communicate ▼ 3 Messages | My Content ▼ | My Profile ▼ | My Points ▼ 05 375 |

Welcome, Tommy! Account Settings | Logout

Search [Gather ▼] for [Blogging] [Go]                                    April 21, 2005

My Points: 65,235                              53

| Summary | Shop | Donate | Buy Points | Setting |

Point Transaction History [Last 30 Days ▼]

| Date | Transaction Type | Earned | Spent |
|---|---|---|---|
| 03/29/05 | Email | 20 | |
| 04/11/05 | Publish | 400 | |
| 04/14/05 | Donation | | (100) |
| 04/19/05 | Tip from Chris M. | 50 | |
| | Total | 370 | |
| | Previous Balance | 0 | |
| | Net Change | 370 | |
| | Current Points | 370 | |

88

How to Earn Points
Earn Points at G'
There are many ways that you can

We'll credit your account with 500 Gather points with your first Gather Target@Visa card purchase.

Earner of the Week
Tommy C. - 19,438 Points!
Somerville, MA

G: Tommy, what makes you such a good Gather Points Earner?

TC: "Working for product engineering at Apple Computer, I have a first-hand view of all of the new, secret projects me handily for that information - who knew? It couldn't have been easier!"

Buying Power
Today, with 65,235 points you're able to redeem your points for some great merchandise with Gather or one of our trusted partners. Here's just a few of the many great things you can get.

>>$300 iTunes Gift Certificate from Apple

>>$300 Cash from American Express

>>Fuji 12-Speed Mountain Bike

Special Offer
>>Donate 20,000 points to the Boston MFA and receive 2 tickets to visit 'Speed, Style, and Beauty' Cars from the Ralph Lauren Collection. A $100 Value!

Sponsored Links

More Than a Blog [more]
A revolutionary new way to publish your stuff on the web.
www.squarespace.com Blogs for Young People [more]
Get a free blog and share your adventures and life with the world!
www.tigblog.org Make Money Blogging [more]
Learn How to Make Money With a Blog in This Crash Course.
SuccessBlog.biz Free Blogs at Blogster [more]
Community blogging
2 minutes to your own blog.
www.blogster.com Start Your Free Blog [more]
Blog for free. Over 25 templates to choose from. Start your blog today
www.journalhome.com Create Your Own Blog - It's Free Post, Publish, Get Feedback.
www.MyBlogSite.com Today's Blogs [more]
What are The Bloggers Saying Today? The Latest On The Web.
www.state.com Blogging [more]
Powerful and easy to use.
Includes 1 GB of space, domain, & email.
www.blogidentity.com Ads I've Seen Recently >>
Your Ads Here >>

| View ▼ | Publish ▼ | Connect ▼ 18 New | Communicate ▼ 3 Messages | My Content ▼ | My Profile ▼ | My Points ▼ 05 375 |

Welcome, Tommy! Account Settings | Logout

Search [Gather ▼] for [Blogging] [Go]   April 21, 2005

Connect

| Summary ▼ | Find People | Create Group | Add Contact | Invite People |

Show All Connections
Friends
Family
Colleagues
- - - - - - - - - - -
Massachusetts Activist Club
Group 2
Group 3
Group 4
- - - - - - - - - - -
Same School
Same Employer
Online Now Username
Username
(View)
- - - - - - -
Username
Username
(View)

Pending Connection Requests

| ☐ Name ▼ | Approve ▼ | Decline |
|---|---|---|
| ☐ Tom Gerace (as a Friend) | Accept | Decline |
| ☐ Tommy Churchill (as a Friend) | Accept | Decline |
| ☐ Chris Marstall (as a Friend) | Accept | Decline |

Invite more friends to become Gather members
Nunc ut est. Lorem ipsum dolor ait emet, consectetuer.
lacus semper est.

| [    ] | ☐ Friend ☐ Family ☐ Colleague |
| [    ] | ☐ Friend ☐ Family ☐ Colleague |
| [    ] | ☐ Friend ☐ Family ☐ Colleague |
| [    ] | ☐ Friend ☐ Family ☐ Colleague |

Optional Personal Message:

You have been invited to join Gather

[Invite Friends]   [Cancel]

Sponsored Links

More Than a Blog [more]
A revolutionary new way to publish your stuff on the web.
www.squarespace.com Blogs for Young People [more]
Get a free blog and share your adventures and life with the world!
www.tigblog.org Make Money Blogging [more]
Learn How to Make Money With a Blog in This Crash Course.
SuccessBlog.biz Free Blogs at Blogster [more]
Community blogging
2 minutes to your own blog.
www.blogster.com Start Your Free Blog [more]
Blog for free. Over 25 templates to choose from. Start your blog today
www.journalhome.com Free Blog [more]
Create Your Own Blog - It's Free Post, Publish, Get Feedback.
www.MyBlogSite.com Today's Blogs [more]
What are The Bloggers Saying Today? The Latest On The Web.
www.state.com Blogging [more]
Powerful and easy to use.
Includes 1 GB of space, domain, & email.
www.blogidentity.com Ads I've Seen Recently >>
Your Ads Here >>

Home Feedback Help Sign Out | Browse | Publish | Connect | My Content | My Network | My Info Tags ⊙ Suggested ○ Most Viewed ○ Most Discussed ○ Most Published
gather.com/...arts, books, business, education, environment, family, food
🔍 Search Articles → About search

My Dashboard

Tag: food ←—110
Related Tags: Recipes, Recipe, cooking, haggis, humor, family, joy, love, happy, boston, ham, worstmeals, sheep, irish, france Signed in as: ajb
Connections: 15
 Invite others
Gather Points: 0
Guarded Viewing: Off Members
[Most Viewed ▾]
○ Today ⊙ This Week Featured articles - view all Monica Kennedy
Willow Spring, NC
Views: 579

Madam Dumas' Secret
by Mimi Mieux | Rating: 9.3 | Comments: 11
January 20, 2006 05:56 PM EST - The Messages Daydreambeliever.gather.com

"D"
CONSPIRACY
FALLS CHURCH, VA brandy, or perhaps... more
More Recommendations
- Make Mama Look Good; Nearly Vegetarian Groups
Have a great good idea?
Setting it up is quick and easy.

conspiracy.gather.com jessie volgts
MI
Views: 531
jessiev.gather.com

Edward
Nudelman

Top articles - view all
[Highest Rated ▾] ○ Today ⊙ This Week
○ This Month
There are no ranked articles available within the past week.

Top images - view all
[Highest Rated ▾] ○ Today ○ This Week
⊙ This Month

Sponsored Links

Your Ads here

Beverly, MA
Views: 523
enudelmanx.gather.com
sadi ranson

Recent articles - view all
Cy-Ku: Mint of Christ
by Lucie S. -- Jan 25 | Rating: 5.5
Tags: haiku, food polizzotti
Views: 465
sadiransonp.gather.com Groups
No groups including this tag have been created that you have Tags: mad, money, food, cream
Recent images - view all Clare Eats  peta2 dotcom Jan.26, 2006    peta2 dotcom  peta2 dotcom
See what Danone did for ...
by Carey P. | Tags: mad, money, cramer, food

FIG. 10

USER-DRIVEN MEDIA SYSTEM IN A COMPUTER NETWORK

RELATED APPLICATIONS

This application claims the benefit of U.S. Provisional Application No. 60/674,606, filed on Apr. 25, 2005, U.S. Provisional Application No. 60/690,005, filed Jun. 13, 2005 and U.S. Provisional Application No. 60/734,690, filed Nov. 8, 2005, the entire teachings of which are incorporated herein by reference.

BACKGROUND OF THE INVENTION

Traditional media includes newspapers, magazines, television and radio programs, films, music and the like. Traditional literary works include novels, essays, poems and other composed articles ("compositions" generally). With the advent of the digital age and global computer networks, literary works or compositions have grown to include Web documents, electronic books, e-zines, so-called "White Papers" and a variety of content in combination with text such as hyperlinks, images, graphics, animation, audio/video, bookmarks and multimedia. Such authored work or works (or generally referred to as "content") is so-called 'published' on a global computer network (e.g., the Internet) through Web page locations of a Web site, bulletin boards or other global computer network postings.

Historically such media has been generated centrally by organizations that contract with a small number of contributors (writers, producers), establish an editing organization to select from this content, and then distribute that content through either their own channels (e.g., the New York Times printing service or the ABC broadcast network) or via the public Internet (on sites like NYTimes.com or CNN.com).

Along with global computer network publications, the area of advertising on the global computer networks continues to grow and develop. Current advertising mechanisms include banner ads, pop-up ads and sponsorship columns or textual advertising.

SUMMARY OF THE INVENTION

The present invention provides user-generated content systems and user compensation methods and apparatus. Key to these systems, methods and apparatus is the aggregation of user traffic and organization of content into usable forms.

In an analogy to retail sales, what eBay has done for on-line retail, the present invention does for on-line media. Historically in the retail sector, family owned corner stores were replaced with large corporate stores (e.g., The Gap, Walmart, etc.) which carried larger inventory. On-line retailers (e.g., Amazon.com) further improved on inventory control by centralizing end-user sales activity while physically storing goods in a widely distributed manner. That is, while Walmart had to carry thousands of an item to have the item on store shelves, Amazon.com needed just one of the items to list it as "in stock".

The launch of eBay, however, marked a revolutionary change. eBay eliminated the need for inventory management entirely. Customer acquisition was done by eBay customers themselves. eBay simply provided the profitable part of the transaction: an electronic platform where users could reach and transact with one another. They aggregated an audience, allowed easy access to product information and provided a financial infrastructure for commerce. Entire businesses have been built on that platform. User-driven retail was born.

In the media sector, local newspaper/magazine/radio and television stations were supplanted by national media companies such as Time-Warner, Inc., Disney Company and Viacom News Corp. Next, media companies moved on-line to decrease distribution costs and user acquisition costs.

The present invention further shifts to the user the tasks of editing, organizing content and to some extent distribution and user acquisition. Thus, the present invention capitalizes on a broad user base to create, organize and edit content and provides a computer system (i.e., method and apparatus) for enabling the same. In a preferred embodiment, the present invention provides a platform that allows Internet users worldwide to publish their own content, rewards those users for content that is popular and of high quality, and allows a broader reader community to explore (search by author, relative popularity and/or keyword, etc.) that content, post comments on it (bookmark it and/or tip the author), rate it (and the appropriateness of its tags/keywords) and even organize (from user relationships, connections or groups) around it.

In addition, the present invention system shares, in the form of points or currency units, advertising revenue with users that provide content; the size and type of reward is based on the quality and popularity of the content they provide and the frequency with which they provide it. Applicants believe that these market-based rewards provide better compensation for good contributors than traditional media which pays on a fixed-contract or per word basis. Such rewards or writer compensation encourages leading writers to publish with the present invention system over alternative media companies, improving the quality of content available to the system readership.

As the number of users on the system grows, there is an increasingly active membership which in turn results in a broader pool of content on the system. Incentives that reward the production of high quality content and popular content encourages members to invest more in their system activity. Over time, these two forces drive increased breadth, depth and quality of content, resulting in a better overall experience for all those visiting/using the invention system. From a business perspective, this creates a self-perpetuating network effect.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2e-2g are block and schematic diagrams of group interface pages of one embodiment of the present invention.

FIGS. 3a-3d are screen views of the user interface supporting the composing, categorizing and tagging operations of the present invention.

FIGS. 4a and 4b are illustrations of the reader interface, including a list of content prioritized based on the reader's expressed interests, the relationships that reader has with various writers and the recency and quality of the materials being presented.

FIGS. 4c-1-4c-2 are screen views of the user interface supporting the reader rating and tipping operations of the present invention.

FIG. 4d is a screen view of search results and search facets in the reader search operation of the present invention.

FIG. 6 is a schematic illustration of the user interface including a compensation summary of points earned and spent by a given user.

FIG. 7 demonstrates a reader-user's ability to tag an article written by a writer-user.

FIGS. 8a-8c demonstrate how users form connections to other users and define arbitrary groups of users.

FIG. 9 demonstrates how a user may subscribe to the content of another user, content by all users filed under a common topic, or content published to a group of users.

FIG. 10 illustrates a tag home page in one embodiment.

DETAILED DESCRIPTION OF THE INVENTION

A description of preferred embodiments of the invention follows.

Applicants recognize that the global computer network publications area is rife with potential visibility, readership and authorship. As such, Applicants pose a desire to harness this media and the user interactivity of the global computer network environment into a user driven media company (or "system" generally). This media system 100 purports that users not just consume content as they did in traditional media, but that some of the users also create (author), edit, organize (keyword tag or categorize), and/or rate the content. To that end, the invention system provides an underlying, financially sound, contributor (frequent writer) compensation program, a reader rating and tipping subsystem, a subscription feature, tag spam prevention feature and many other features described below.

In the invention system, content (including authored works, bookmarks, comments, tags) is organized (or ranked) by number of times viewed by reader users, by quality and/or popularity ratings and by comments received on the content. Such ranking may be for a certain time frame (e.g., prior week, current week), by tag area (keyword) or across all tags. In some embodiments, the invention system determines and displays lists of most popular tags for writing (composing authored works 29), reading and/or discussing authored works among system users.

Similarly, the invention system organizes or ranks authors by number of times an author's works are viewed by reader users, by quality and/or popularity ratings and by comments by others on the author. Such author ranking may be across a certain time period (e.g., prior week, current week), by tag (keyword) or across all tags.

As will be detailed later, the invention system determines which tags or sets of tags are commonly used together. This related tag information is employed in various features of the invention system. In one example, the invention system displays (a) an authored work, (b) an ordered listing of related tags with respect to the tags of the authored work, and (c) rating of the authored work all together in a working screen view for enabling reader users to navigate through and search the system. An anti-tag spam feature solves the problem of users too broadly classifying an authored work to gain reader traffic. This system feature removes the offending authored work from the system, removes the tags of the offending authored work and/or cites the tags as inaccurate for the offending authored work.

To place the foregoing into context and make clear the various aspects of the present invention, an example embodiment is presented and described next.

Figure 1A:
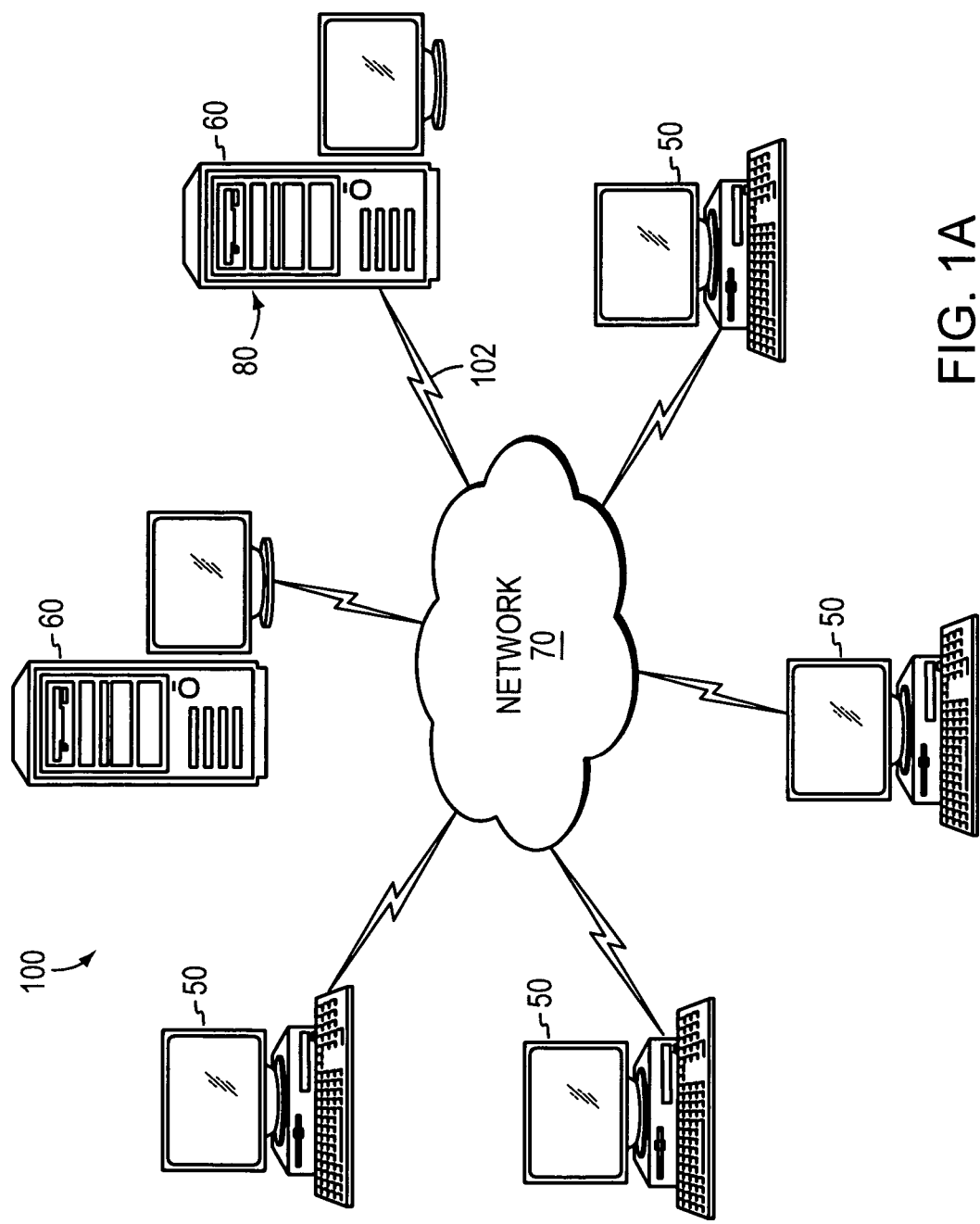
FIG. 1a is a schematic diagram of a global computer network environment in which embodiments of the present invention operate.

Illustrated in FIG. 1a is a global computer network environment in which embodiments of the present invention are implemented. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. Other global computer networks 70 are suitable.

Figure 1B:
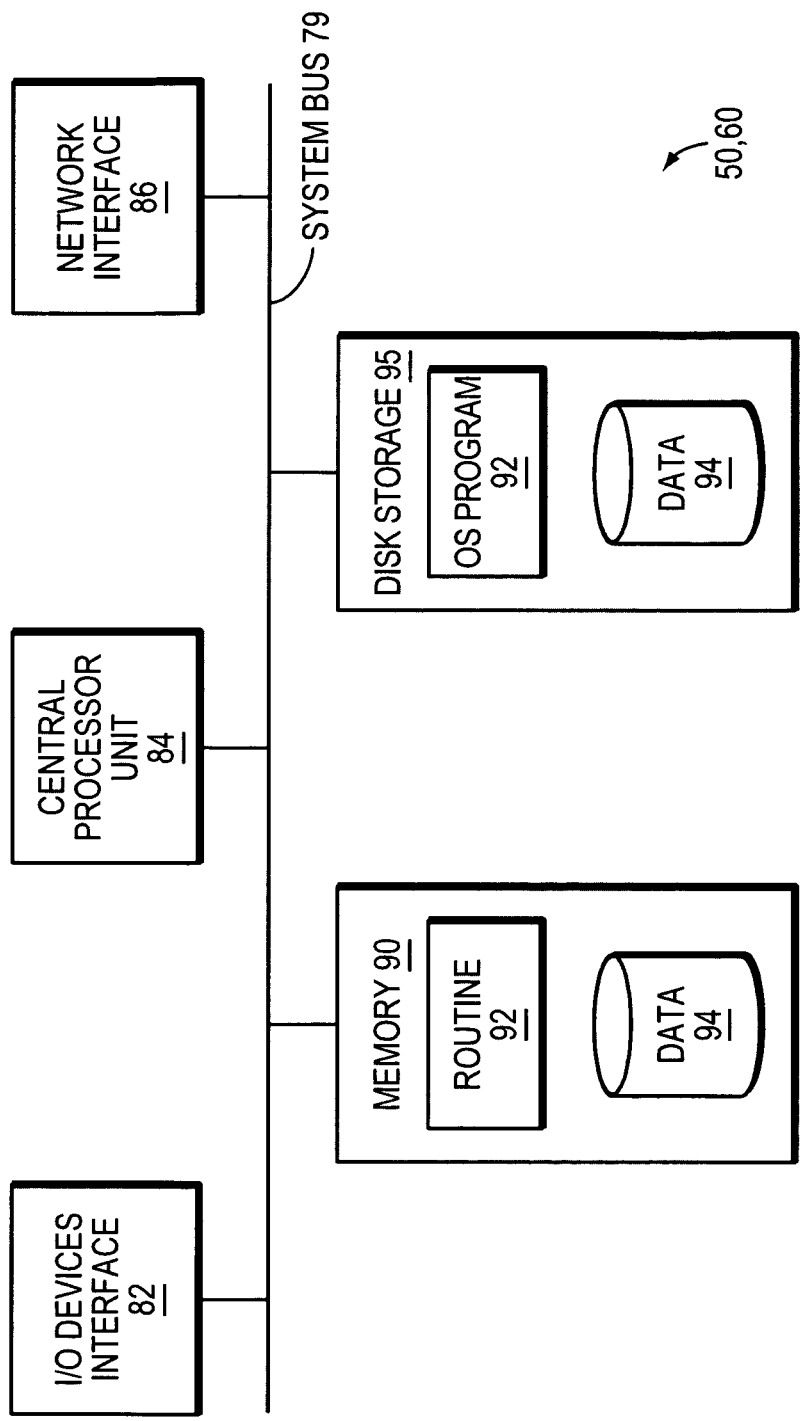
FIG. 1b is a block diagram of the different components of a computer node in the network of FIG. 1 embodying the present invention.

FIG. 1b is a diagram of the internal structure of a computer 50, 60 in the network of FIG. 1a that implements the present invention. The computer 50, 60 contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 1a). Memory 90 provides volatile storage for computer software instructions used to implement an embodiment of the present invention (e.g., Program Routines 92 and Data 94). Disk storage 95 provides non-volatile storage for computer software instructions and data used to implement an embodiment of the present invention. Central processor unit 84 is also attached to system bus 79 and provides for the execution of computer instructions.

In one embodiment, computer program product 80, including a computer readable medium (e.g., a removable storage medium such as one or more DVD-ROM's, CD-ROM's, diskettes, tapes, etc.) provides at least a portion of the present invention software instructions. Computer program product 80 can be installed by any suitable software installation procedure, as is well known in the art. In another embodiment, at least a portion of the software instructions may also be downloaded over a wireless connection. Computer program propagated signal product 102 embodied on a propagated signal on a propagation medium (e.g., a radio wave, an infrared wave, a laser wave, a sound wave, or an electrical wave propagated over a global network such as the Internet, or other networks) provides at least a portion of the present invention software instructions.

In alternate embodiments, the propagated signal 102 is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network. In another embodiment, the computer readable medium of computer program product 80 is a propagation medium that the computer system 10 may receive and read, such as by receiving the propagation medium and identifying a propagated signal embodied in the propagation medium, as described above for computer program propagated signal product 102.

In one embodiment, software instructions 92 executed on client computer 50 (the user's desktop machine) includes code for (1) composing content/authored works 29 including text, audio, video, graphics, multimedia, images, comments, bookmarks and/or keywords or tags, (2) accessing content through searching, sorting and classifying information, (3) organizing content/authored works 29 (comments, bookmarks, etc.) by author and/or keyword tags—organizing here including any of rating, commenting on and classifying/categorizing, (4) forming groups and relationships or connections and using relationships to organize content and browse the system for content, and (5) keeping track of their accounts and points balance.

FIGS. 2a-2h illustrate the corresponding computer software code 92 executed on a server computer 60. Server 60 code provides a Home Page 21 of the invention system 100 (i.e., user-driven media company Website). At the Home Page 21, the operations of General Information/Help 23, Search 25, View 27, Publish 11, Connect 31, Communicate 33, My Content 35, My Profile 37 and various accounting 39, 41 are provided.

Through registration process 45a, b (FIGS. 2b and 2d), a user (an individual, a company or other entity) becomes a member to the invention Website/company (or registered user of the invention system 100). In one embodiment, during registration 45, users enter profile and other information, including a user name, email address and login confirmation. My Profile 37 is a set of aspects and settings that results from such user input in registration process 45. In one embodiment, My Profile 37 includes (i) general information, (ii) demographic information, (iii) school/college information, (iv) indications of hobbies, entertainment and TV/media likes/interests, (v) personal biographical data, (vi) political affiliation, (vii) other affiliations, (viii) companies and (ix) photos, for example. Other categories of information are suitable. Advertiser users (business affiliates) use a different process 47 (FIG. 2b) to register with the invention system 100.

Example data sets supporting the user registration process 45 and My Profile 37 in a preferred embodiment are as follows. Database tables for storing and relating user data (e.g., My Profile 37, etc.) and other system data are employed as illustrated in FIG. 2h and discussed later.

About Me

The system 100 provides members the ability to publish information about themselves. There are two types of profile information: basic and extended. The basic profile is preferably always public to every one where the extended one can be customized. The member can however specify if his basic profile should be shown to non-members (default is to show in one embodiment).

The extended profile of a member-user is divided into blocks of information. The user may set the audience who can see each or respective blocks of information.

The user is able to enter extra or additional information that is not already an offered standard area of information of system 100.

Connection Management 31

Members are able to build a social network of friends, family members and coworker. In one embodiment, connection management 31 follows the operations and parameters outlined in Table 1.

TABLE 1

Connection Management

| Feature | Description |
| --- | --- |
| Three connection classes | One embodiment of the system 100 provides three connection classes:<br>Friend connection<br>Family connection<br>Work connection |
| Connection classes distinct | Friends can only see other friend connections (similarly for work and family connections). |
| Connections are reflexive | If person B is person A's connection then person A is person B's connection too. If person B is NOT person A's connection, then person A is not person B's connection either. |
| Connection invitation | Establishment of a connection between two members is made by one user sending a connection invitation to another member (or non member). |
| Connection acknowledgement | New connection must be acknowledged by both parties tied in the connection. When acknowledging, the member has the option to "also subscribe to this member . . . ". |
| Invite non members | A member is able to send an invitation to a non member. If the invitation was sent to a non-system member (invitee), the invitee is able to join system 100 and after which be automatically connected with the "invitor". Note that requirement "connection acknowledgement" must be satisfied. |
| View "who's online" | The member is able to know who among his connection is currently online. User can control his presence knowledge per friend class. |

TABLE 1-continued

Connection Management

| Feature | Description |
| --- | --- |
| Show prior invitations after registration | Let's say that a person has 2 email addresses, one which he rarely checks. Let's also assume that 5 different members sent him registration invitations to his "less watched" address and 1 to the one he monitors more. After the registration process 45 (where he input his 2 email addresses), the system 100 automatically creates 6 connections with other members. |
| Deleted connections | A user can delete a connection at any time |

External Contact

The system 100 provides the user the ability to enter contact information of people that are not system members. In one embodiment, operations and parameters supporting this ability (functionality) are outlined in Table 2.

TABLE 2

External Contact

| Feature | Description |
| --- | --- |
| External contact are private | A member's external contact information is held private. No one but the member can see this information |
| Easily send invitation to external contact | A member must be able to easily send an invitation to an external contact. |
| Ability to import/export/sync | A member is able to import/export/sync his contact list. This feature mimics PLAXO ™ or similar. |
| Support mailing lists | The member can create mailing lists. The number of email addresses in the mailing list has a limit which is customizable in system 100 (set by the system administrator). |

When a member sees another member's profile information, the system 100 (connect module 31) shows him if he is connected to that member and how he is connected to this member by showing the shortest connection path from him to the other member and for each connection class. The system 100 preferably shows multiple paths of network relation, up to three levels or degrees of separation. Me>User 1>User 2>You. A subject user sees his closest connection. Beyond three levels, the system 100 indicates that the subject user is not closely connected in one embodiment. The number of people connected between a given user and a subject target person (including the target person) is termed the 'degrees of separation' with respect to the user.

One embodiment measures strength of one user's connection to another user by evaluating any combination of:
  frequency of the one user sending instant messaging/email to the other user;
  time between receipt of message and opening of the message;
  time between receipt of message and reply to the message;
  time between when the one user sends a message to the other user and that other user opens the message; and
  time between when the one user sends a message to the other user and that other user replies.

The system 100 relations (connect) module 31 may define asymmetrical strength of connection between two users.

System to Confirm Email Addresses

The system 100 makes a distinction between confirmed email addresses and unconfirmed ones. Operations supporting this are outlined in Table 3.

TABLE 3

Confirm Email Addresses

| Feature | Description |
| --- | --- |
| Login with any confirmed email. | Any confirmed email addresses can be used to login to the system site 60 |
| Lookup unconfirmed email | Confirmed email addresses can only be used to lookup a member. The system 100 warns a user when attempting to use it (such as trying to send an email to an unconfirmed email address) |
| Steal unconfirmed emails | If user A has an unconfirmed email address of a@a.com and users B confirms the email a@a.com, then the system 100 removes this email from A's list of unconfirmed email addresses. |
| Unconfirmed emails flagged | Any email that is unconfirmed is flagged as such. |

Groups

There are two types of groups: "personal groups" and "shared groups". A Personal group is a private list of other members and contacts. Techniques similar to address book groups in email systems are employed to support this feature.

A shared group is a place holder where articles (authored works) 29 can be published and group members notified when a new publication occurs or when someone posts a comment on an article that is part of the group. Shared groups allow their members to have a common location where they can communicate and membership of the group is generally viewable by all group members.

In one embodiment, a master database table 120, user tables 122, publication table 124 and tagging table 126 as illustrated in FIG. 2h support the foregoing and other features of the invention system 100. Briefly, system 100 assigns a unique identifier to each group. Master database table 120 lists groups by unique identifier. For a given group, the corresponding entity in master database table 120 lists the members (user names) of the group, lists invitations (names of invitees) to the group, lists blocked users names from the group and group settings (further described below in FIG. 2g).

Each user has attributes and a profile 37 (discussed above in FIG. 2c) stored in a respective user table 122. For a given user, the respective user table 122 includes the groups (e.g., by respective group identifier) to which the user belongs and subscriptions to other users (author users). Certain user attributes and activity are also recorded in and/or tracked by respective user tables 122. For example, in one embodiment, the user profile 37 includes an indication of authored works 29 read by the subject user and comments he has made on respective authored works 29. A pointer, link or reference or the like to a comment entry in publication table 124 provides the comment contents (text). This enables system 100 to determine and display most commenting user, most commented on user or authored work 29, commenting rates of groups and other statistics/standings or similar information. This may be done dynamically or for static stored data 94.

In one embodiment, user table 122 of a user stores indications of earnings (amounts earned as an author in the system 100), quality ratings, popularity ratings and relative rank to other users as authors. The ratings and rankings may be per tag (keyword) or across all or most tags in system 100, and may be for a certain time period (e.g., prior week, current week). Alternatively these ratings and rankings may be dynamically calculated before each display/use in system 100. In one embodiment, system 100 displays lists of authors with fastest increase in rank and fastest decline in rank. To that end, user table 122 indicates changes and/or rate of change in author ranking. Change in ranking is based on any of: quality rating of author, popularity rating of author, and/or these two ratings multiplied by each other. Changes in rank may be indicated as a percent change or number (count) of rank levels.

Likewise, system 100 employs user tables 122 to determine and display author users with fastest growing subscriber base. For each user, that one user may subscribe to an author user and this is indicated as a subscription 71 in the user table 122 of the one user. System 100 displays to each subscriber an indication of his subscriptions 71 and displays to the author user a list of his subscribers. Communicate member 33 or other system means notifies a subscriber user of updates (e.g., new authored works, etc.) made by the author user. This may be by refined notification operations effective per topic or keywords in some embodiments. Similarly, system 100 may employ alerts that generate a message (through communicate member 33) to a subscribing user that a prior published authored work by the respective author has been updated. The generated message may include, attach or otherwise forward a copy of the updated authored work to the subscriber user. If there is more than one such updated authored work, system 100 prioritizes the updated authored works based on quality, popularity, closeness of the subscriber user relationship to the author or interest rankings of the user to the author.

The publication table 124 relates who (user or group) created what authored works 29. For each authored work 29, publication table 124 indicates authored works' 29 composition or content including any one or combination of text, images, video, audio, graphics and/or multimedia, as well as users' comments on the work and/or bookmarks to the work 29. An indication of user responsible for a comment is by pointer or similar reference to the respective user table 122. Publication table 124 supports display of comments during display of corresponding authored work 29. The comments are visible to the author and/or other users. The publication table 124 entry also stores or indicates the amount of tips given to the author user for this authored work 29.

Publication table 124 also enables reports to an author showing names of reader-users who have read authored works 29 by the author and allows the author to browse profiles of the reader users. In some embodiments, the reports aggregate the profiles of reader users showing aggregated data for those users. The author is then able to substantially automatically target advertising based on profiles of reader users. In a similar manner using tagging tables 126 (discussed below) with publication table 124 data, authors can see keywords most often used by reader users of their authored works 29. Indications of authored works 29 or comments are shown on a reader user's profile in user tables 122 such that others can see what that user has read. System 100 further enables users to subscribe to the comments of other users to see what people they like or have an interest in are reading most frequently.

In one embodiment, the table record for an authored work 29 in publication table 124 stores or tallies (a) count of the number of times the subject authored work 29 has been cited in an email message sent through system 100 (communication subsystem 33), (b) the number of times the subject work 29 has been forwarded by email and/or (c) the number of times the subject work 29 has been cited in another authored work 29 in the system. The table record also stores a count of the number of times the subject work has been viewed. The dates of viewing are also tracked (recorded). From this data, system 100 determines quality and/or popularity ratings and rankings of authored works 29. Thus, table 124 may also record the quality and/or popularity ratings and rankings of the authored works 29. The ratings may be per tag (keyword) and/or across all tags, as well as over a certain time period indicated in the record.

Each bookmark and each comment has a respective entry (or record) in publication table 124. In one embodiment, each bookmark or entry has a URL or pointer like reference, a title, a synopsis and/or indication of author. The bookmark entry may also provide a snapshot (summary) of the respective bookmark or be reproduced in its entirety (full text/graphics data). The bookmark entry also stores any additional annotations or comments by the creator of the respective bookmark. The bookmark record includes popularity and/or quality ratings similar to those employed for authored works 29 described above. A counter or similar mechanism keeps track of number of bookmarks a given work 29 has. The bookmark records and entries in publication table 124 enable system 100 to determine and display to a user his bookmarks, other user's bookmarks and/or all system bookmarks, as well as display an indication of popularly bookmarked authored works 29 and the like.

In one embodiment, the bookmarking means enables the user to selectably make visible to other users and authors each bookmark. System 100 then enables users to comment on and rate quality of bookmarks. As such, system 100 further displays (i) lists of bookmarks based on popularity and/or quality rating, (ii) an indication of bookmarks having greatest increase in popularity and/or quality rank, and (iii) an indication of bookmarks having greatest decline in popularity and/or quality rank.

Each comment entry (record) in publication table 124 indicates author of the respective comment, authored work 29 (or bookmark) and/or author of work/bookmark to which the comment is aimed, and text of the respective comment. Common relational database techniques are employed to organize the comment records by and display lists of most prolific author of comments (most commenting author user), by author user or authored work 29 most commented on and/or by best comments on a given work 29 or bookmark.

The publication table 124 entry for a given authored work 29 also links to or otherwise references through tagging table 126 keywords or tags that users (author user as well as reader users) have assigned to the authored work 29. Similarly, tags may be associated with bookmark or comment entries/records in publication table 124. In some embodiments, the publication table 124 entry for a given authored work 29 also indicates categories/subcategory (topic areas) that users (author user, reader users) have assigned to the authored work 29.

The tagging table 126 indicates particular tags or keywords applied respectively to authored works 29, bookmarks and comments in publication table 124. In particular, for a given keyword, tagging table 126 lists content items/authored works 29, bookmarks and/or comments that have been assigned that keyword. Using common cross-indexing (cross-referencing) techniques between tagging table 126 and publication table 124, system 100 provides lists (hierarchy orderings) of related tags per authored work 29 or topic area as discussed below in FIG. 10. For example, in response to a user using a keyword in operations of system 100, the system utilizes tagging table 126 and presents a list of additional keywords that often appear together with the keyword. The additional keywords are user selectable for further specifying operations of the system 100. Upon user selection of one of the listed additional keywords, the system 100, through tagging table 126, presents further additional keywords for additional user selection.

In some embodiments, each tag (keyword) has a respective record in tagging table 126. For a given tag, the respective table entry (record) indicates number of times the tag has been bookmarked, commented on, included in an email message in communication subsystem 33 or cited in other works in system 100. This counting enables system 100 to make a popularity determination of the tag. Separate popularity measures and indications may be made for reading purposes, writing purposes and/or discussion. System 100 determines quality of the tag based on responses/feedback from users indicating alternative tags or indicating that a tag is being incorrectly used (deceptive, inaccurate, inappropriate, etc.) The foregoing allows system 100 to indicate various quality and/or popularity ratings of the tag, e.g., fastest increase in popularity rank and fastest decrease in popularity rank.

Based on the above ratings, system 100 also ranks the tags. The records in tagging table 126 indicate rank of a tag over a period or time or within a certain time frame (for example, the prior week or the current week). System 100/tagging table 126 also tracks rate of change in rank of tags so that a display of fastest incline in rank and/or fastest decline in rank may be made.

In one embodiment, the top certain number of keywords most frequently suggested are displayed in ranked lists for navigational purposes. The ranked lists include a list of keywords most often published by, a list of keywords most often commented on, a list of keywords most often selected by readers, a list of keywords most often searched on and/or a list of keywords most often forwarded in email messages. The system 100 further identifies multiple different spellings of a word including misspellings. The system means links each identified different spelling to a most frequently used, properly spelled term for that word and displays that term instead of the other spellings in system screen views. In response to reader users selected or suggested keywords for an authored work, the system means provides additional keywords for selectable use as tags to the subject authored work 29. For each additional keyword, when not selected by a reader user or author, the system marks the additional keywords in tagging table 126 as negatively correlated to the authored work 29. The negative correlation grows stronger each time the system means suggests additional keywords to an author or reader user and the additional keywords are not selected by the user.

Tagging table 126 may also record, cross reference or otherwise indicate tags most commonly used together. Shown in FIG. 10 for example, 'food' is most commonly used with 'recipes' and relatively less used with the keywords 'sheep' and 'Irish'. System 100 uses this data to indicate sets of related tags 110 and in particular ordered sets.

Turning now to FIG. 2g, to create a group, a user provides to system 100 (connect module 31, group function): his name, a description, group profile information 112, such as group URL name, group name, group icon and location of the group (city/state/country), group type 114 (auto-join of new group members, moderation of group members manually, invite only), default member permissions 116 (post, invite, moderate content, moderate members, send broadcast private message, post on behalf of group, feature content), common group "signature" for articles posted by group contributor and various viewable metadata such as create date, number of members, etc. System 100 also has the group creator indicate whether the subject group is adult content oriented. If a group is marked (indicated) as "adult content", system 100 prevents the group (and its contents) from appearing on any search/browsing screen views to users with guarded viewing. Further, system 100 has the group creator indicate 114 who may view the group's content (e.g., group members only or the public).

Preferably, a group has one owner, who can do the following
- Perform all editorial tasks (post, delete, invite, moderate content, control amount of group content, moderate members, send broadcast private message, post on behalf of group);
- Transfer ownership to another member;
- Disable ability of group members to publish to the group;
- Remove users;
- May assign content as 'featured content' in the context of a group;
- May make group's authored works 29 available for viewing by non-group members;
- Manage settings and information about the group; and
- Delete the group.

Groups may be categorized or tagged within the group profile page by the owner. In addition, system 100 uses the tags of the top percentage of viewed articles (for example top 25%) for tagging the group.

The group owner can determine if the name of the group is public (visible to non-group members) and visible groups accept open applications from other system members. The group owner may choose to post content in a group under the name of the group, or to his individual name.

Only group members may post content (authored work 29) to respective groups. The system 100 registered members may read or subscribe to visible groups (based on the group settings and their own user viewing settings) but they must join (become a member of) the group before they can post (publish content/authored works 29) into that group.

User specific permissions may be set as a default for new group users when the group is created. Invites issued for the group inherit these permissions, but the member issuing the invite (if they themselves are authorized) may add additional privileges, such as inviting a new user to have moderation privileges. Those members with user administration privileges may modify user permissions at any given time.

Below is a table of what permissions may be assigned in one embodiment.

TABLE 4

Group Privileges

| Privilege | Who can be granted it (by group owner) | Default |
|---|---|---|
| Read Group articles | Public, Individual group members | Public |
| Post Group Articles | Individual group members | All Group Members |
| Delete Group Articles | Individual group members | Owner only |
| Invite Members to Group | Individual group members | Owner only |
| See Group's Name/Profile | Public, all group members | Public |
| See Group members | Public, All group members | Public, All Group Members |
| Moderate submitted articles | Individual group members | Owner only |
| Remove member | Individual group members | Owner Only |
| Send Broadcast private messages to the group | Individual group members | Owner |
| Post on behalf of group | Owner, Individual group members | Owner |
| Feature Content | Owner, Individual group members | Owner |
| Join group (w/o moderation/auto-join) | Public | Public |

Users may be invited to join a group in two manners. For existing system 100 members, the user may use an interface similar to the internal member search 25 to locate and select the user for an invite to be issued. This is preferably done through the private messaging component 33 of system 100.

For invites to individuals who are not already a system 100 registered member, they are sent an invite via email and led through the invite process. As part of the existing invite process, if the user being invited already has an account on system 100 (based on the email address entered) the invite flow goes through the private messaging component 33.

In some embodiments, there is bulk importing of a list of email addresses for mass mailing of invites. On the administration side, the editorial team has the ability to approve a submitted list for mass invite mailings, allow it always from this group (for a well known/trusted group) or deny the request. The resultant mailing follows the existing 'invite' rules of the current membership system as applies to pending or existing members.

In the case of a user moderated group, a user may request an invite to the group. Group members serving as user moderations receive a notice on their interface that there are pending join requests, and they can approve or deny them. Notifications for these go through email both for the request of invites and the acceptance or declining of requests.

Once a group member has joined, the member is able to:
Be assigned privileges in a group by an owner. Permissions in one embodiment include post, delete, invite, moderate articles, moderate members and broadcast private messages.
See group members and be seen by other members as belonging to the group.
Automatically subscribe to the group's content.
Remove himself from the group, which deletes his subscription to the group if the group is hidden.

As mentioned above, the owner of a group can grant or remove permissions to users within the group. Owners can set the default user permission for new users, as well as if the group members can auto-join without having to go through a moderation/approval process to gain membership. Moderating users and content is similar in that the group members assigned to moderate receive an email notification as well as a visual cue within the system 100 interface to take action (approve an article/authored work 29, decline a user invite, etc).

Only group members with the proper permissions may send 'broadcast' private messages to the entire membership of the group. As a group member, one can also choose not to receive broadcast messages by changing one's preferences.

Group members who have proper permission may post articles to the group. This is done by going through the publication process 11 of system 100, except that on the step prior to preview/publish, there is a list of groups which the member has posting access to. Published content appears both in the group homepage 210 and the author's homepage 21 in system 100, though the user can choose to publish to the group only.

If the posting is by the owner of the group, he may also have a 'post as' option as mentioned above. For example, he could post to the group 'Cool Kids' as his individual/personal name in system 100 or the name of the group (Cool Kids) as the author of the content.

Based on the permissions settings 114 of the group or the specific user as discussed above, submitted content to the group may be put in a 'moderated' state until one of the group moderations approve it for publication into that given group. State machines, flags, indicators or other techniques common in the art are employed. Group members with the moderation privilege are shown a visible indicator in their groups' page that displays content that is awaiting approval. Anyone with a moderator capability may approve the content, or remove the content from the group listing.

Within groups, an article may be deleted by the group owner, a moderator, or the author of the content. The article is only removed from the listing within the content of the group, but will still show up on the author's homepage. Even if a group member leaves a group, that member's articles stay in that group unless specifically removed, in one embodiment.

For the groups system, there are two categories of email notifications—workflow and subscription. Notifications are for the interaction between users for certain group management tasks. Subscription notifications are similar to system wide notifications received by users. The notifications for groups are implemented via the existing notification subsystem of communication member 33. Email applications software notification and other messaging technology are employed to implement communicate members 33 and its subsystems.

Examples of workflow notifications are:
Users requesting an invite to a group
User moderator acceptance/rejection of membership request from a user
Submission of content to a moderated group for review
Content moderator approval/denial to the content author
Moderator deletes an article from the group listing
Examples of subscription notifications are:
New member added to the group
New authored work published into the group
Updates published into the group
Member leaves the group
Group is deleted
Group is renamed
Group profile is updated If content has been published into multiple groups, the subscriber will only receive one email listing the groups, verses a notification for each group.

Viewing of Group Content

Seeing content within groups is dependent on several factors. Essentially, it is the culmination of the viewing permissions set on the group, the content, and the author. FIGS. 2e-2f are illustrative.

Group content can be found in a group in a variety of ways. In one way, if the group is not visible, the group name does not show up in a global site search on any of its content, categories, or tags, or browsing by any of those criteria. The group name also does not appear on any user pages unless one is a user in that same hidden group.

Otherwise, groups are integrated with the search system 25 (both a search within a group as well as a global site search) and accessible through the user interface under the View 27 menu or something as appropriate. As shown in FIG. 2e, groups can be found by browsing for category 200, tag (keyword) 201, or a general group directory 203 by group name. Other embodiments of system 100 include a group keyword search 204 and various filtering group listings 205 for presenting to a user for selection of a group of interest. Groups may be searched by authored works 29 of the group, number of members, publishing rate and/or commenting rate on authored works 29 as well as other parameters/factors as supported by master table 120, publication table 124 and tagging table 126.

FIG. 2f illustrates a specific group homepage 210. Based on group creator input (at connect module 31 as previously described), group homepage 210 displays the creator given group name and icon, and other group information. The illustrated group homepage 210 displays group announcements, a listing of recent authored works 29 posted to the group, a listing of recent authors' works, a listing of recently joined group members and a listing of the user's recent works 29 in this group. Navigation indicators (e.g., "By Tag," "By Category") are also displayed. This enables a user to have the system 100 display indications of (i) group members writing the most on a user-selected tag (keyword), (ii) other groups related to the subject tag (keyword) and (iii) authored works 29 of the group on that keyword. With the latter, system 100 can further display the group's top authored works 29 per keyword, top other media types (e.g., images, photos . . . ) per keyword and recently tagged works 29 of the subject keyword. System 100 also displays a list (preferably an ordered list) of related tags for further user selection (e.g., drill down manner) and navigation at the group home page 210. Other information may similarly be displayed on group home page 210 as supported by publication table 124, user tables 122 and tagging table 126.

Thus, authored works 29 in a group are searchable and viewable by group members according to: tag or keyword, rank in quality, rank in popularity or rank in number of subscriptions, rank in author quality, rank in author popularity and/or rank in number of subscriptions to author.

The content with groups may have a certain version for content syndication out onto other sites. Also, groups may have content syndicated into them via a pertinent feed such as an RSS feed, wire service or other automated technology that allows publishing content. Thus, authored works 29 for groups as well as individual users include works originated in system 100 or elsewhere.

Continuing with FIGS. 2a-2d, the system 100 profiles the known/registered user based on material he writes and reads, what he clicks on (group, article, etc.), the query he enters and the ads he clicks, etc. This profile information is used to better target the known user with advertisement. The system 100 deduces demographic information (city, state, etc.) from a user's IP address, the type of article the user reads, search query he enters, shared behavior with other users (behavior or activities in common with) or shared relationships to other users. In addition, known/registered users can browse all other members' profiles 37. They can browse only the members' public profile information and the members' articles/connections/groups/taxonomies that are flagged as public.

Information about registered users is preferably kept in the system 100 for a given amount of time (in days). If the registered user does not visit the invention website 60 within this period of time, any profiling information kept about this user is discarded and the next time this user accesses the website he will be seen as an unknown user.

Figure 2A:
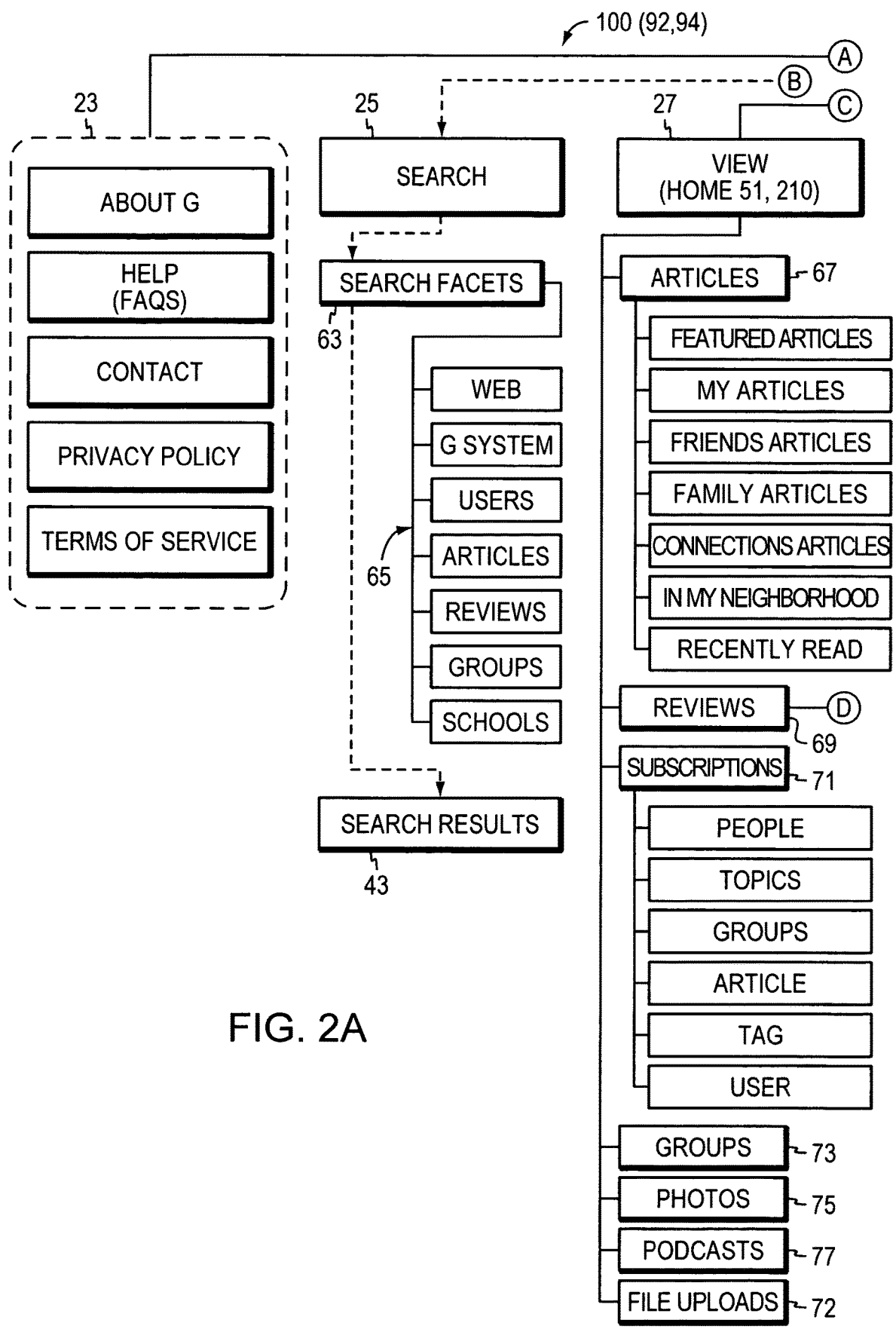
FIG. 2a-2d are system diagrams of a website hosted by a server computer in a preferred embodiment of the present invention.
Figure 2B:
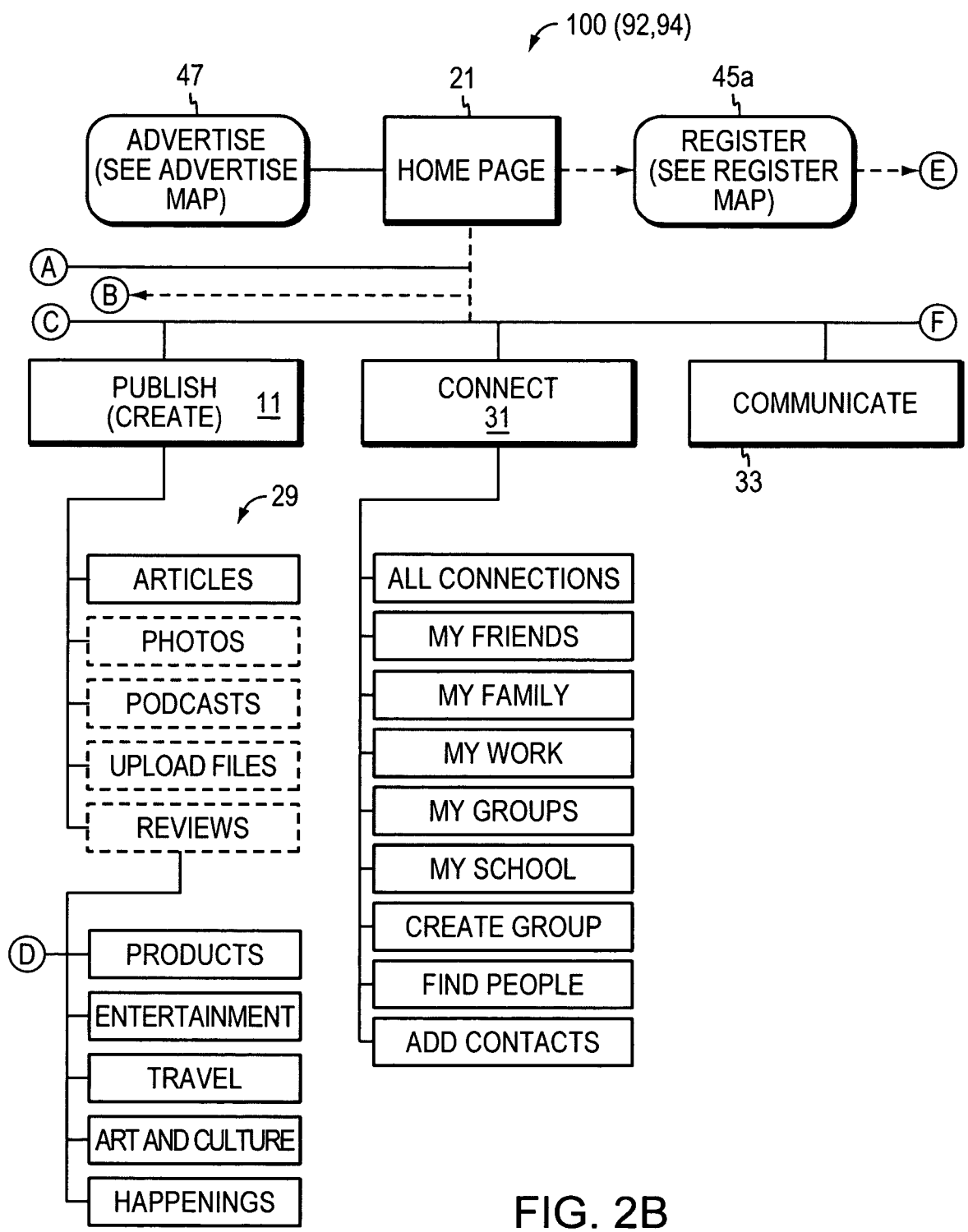

Referring to FIG. 2a, General Information 23 includes website company general information, website company contact information, site help, privacy and other policies and terms of service.

Search operation 25 is the interface to a search engine for processing user queries and generating search results 43 thereto. FIG. 4d is illustrative. A relational database search engine or other data search engine may be employed. In a preferred embodiment, search facets 63 are used to filter candidate search data/results. This has the effect of narrowing available content. In one embodiment, search facets include quality rating (of authors, authored works 29, tags, comments and/or bookmarks), date, topic, time, recency of publication, length of publication, author rating (in popularity and/or quality), authored work rating (in popularity and/or quality), media type, authors per media type, reader rating, amount of tips received by the authored work 29, association with an organization or membership in a group and degrees of separation between author and user. In other embodiments, different facet options or sets are made available after use of an individual facet, and/or facets change with each drill down by the user. In some embodiments, these facets 63 are used to order contents (authored works 29) for search results but not filter the contents. System 100 displays to a user a list of authored works 29 or summaries of authored works 29 organized by any combination of user's interests, relationships, expressed or inferred interest in certain authors and expressed or inferred interest in certain topic areas or keywords.

Initial areas 65 (FIG. 2a) of search include the global network 70, the invention website 100, users of (registered with) the invention system 100, articles (authored works 29), reviews (other authored works 29), groups and schools.

Figure 4A:
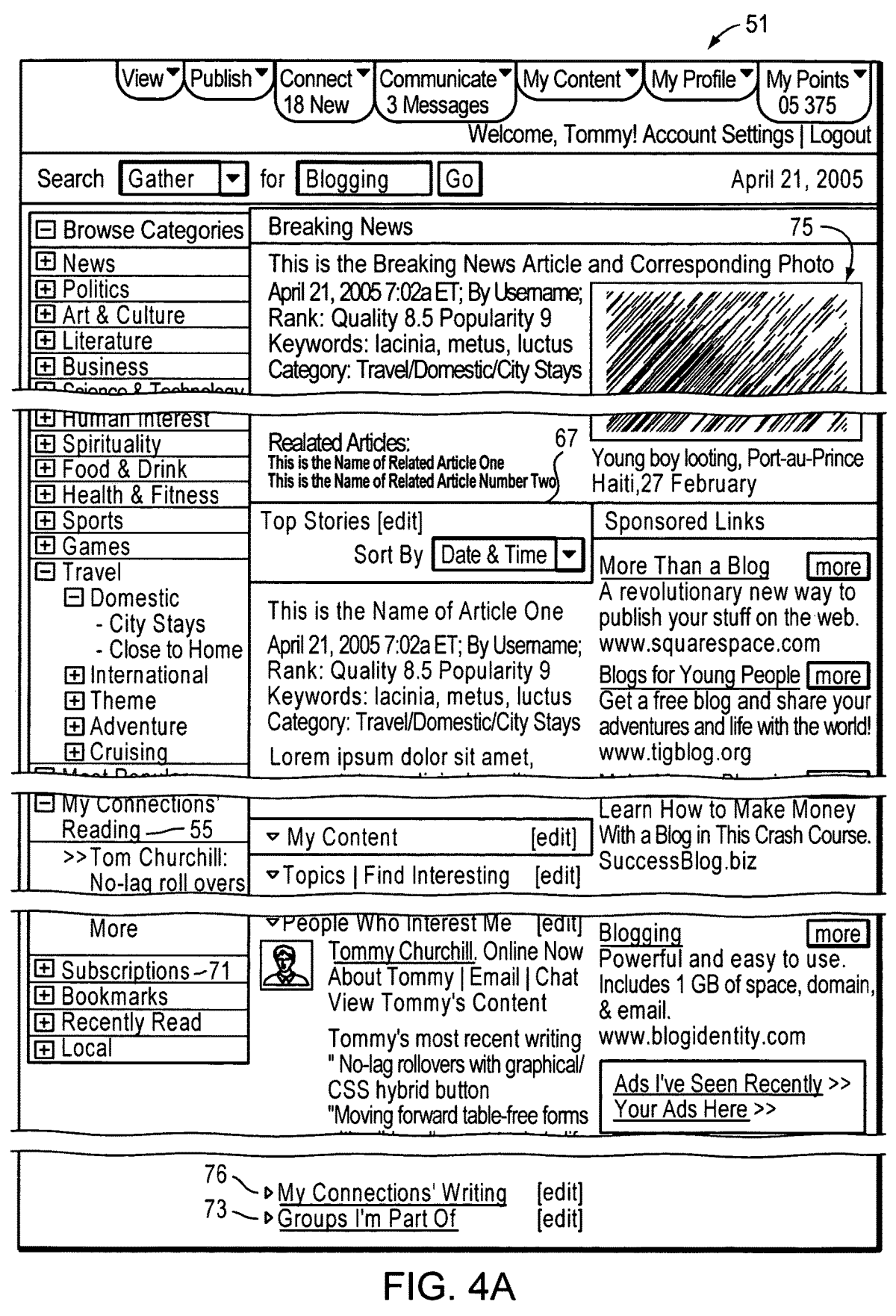
Figure 4B:
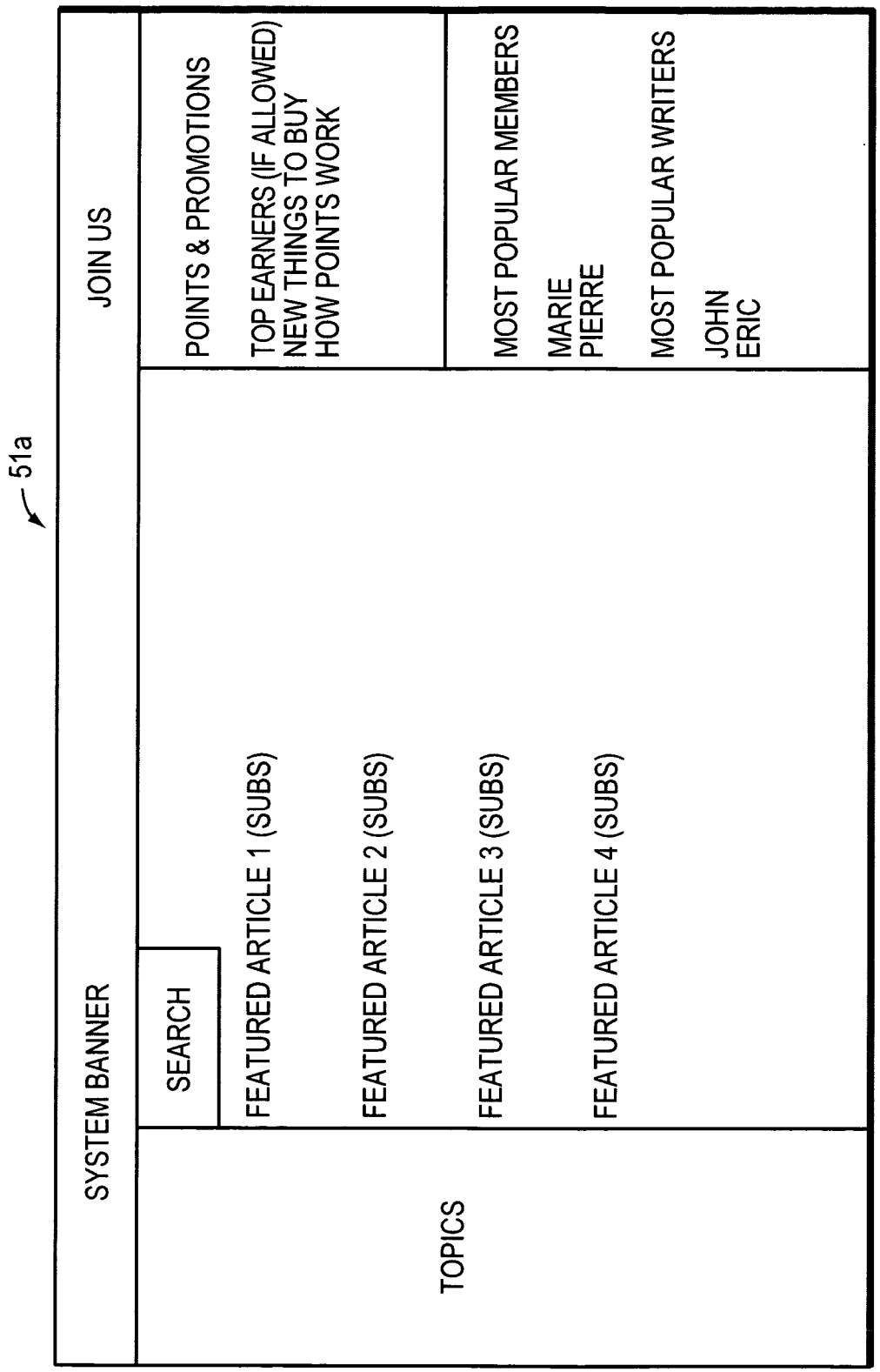

View operation 27 generates screen views for display by client computer 50 to end users. An end user (individual or company/organization) may be a reader-user at times and a writer-user (or author-user) at other times as further discussed later. FIGS. 4a-4b illustrate the initial screen views 51 generated by view operation 27 in response to log in by a subject user. Subsequent screen views are exemplified by FIGS. 4c-4d described later.

The particular user's home page 51 in system 100 indicates articles (authored works 29) and reviews 67, 69 (FIG. 2a) respectively. The articles may be featured articles of system 100, the user's own articles, friends' articles, family articles, connections articles 76 (FIG. 4a), neighborhood articles and recently read ones. Reviews 69 may be of subcategories such as products, entertainment, travel, arts and culture and happenings.

Figure 9:
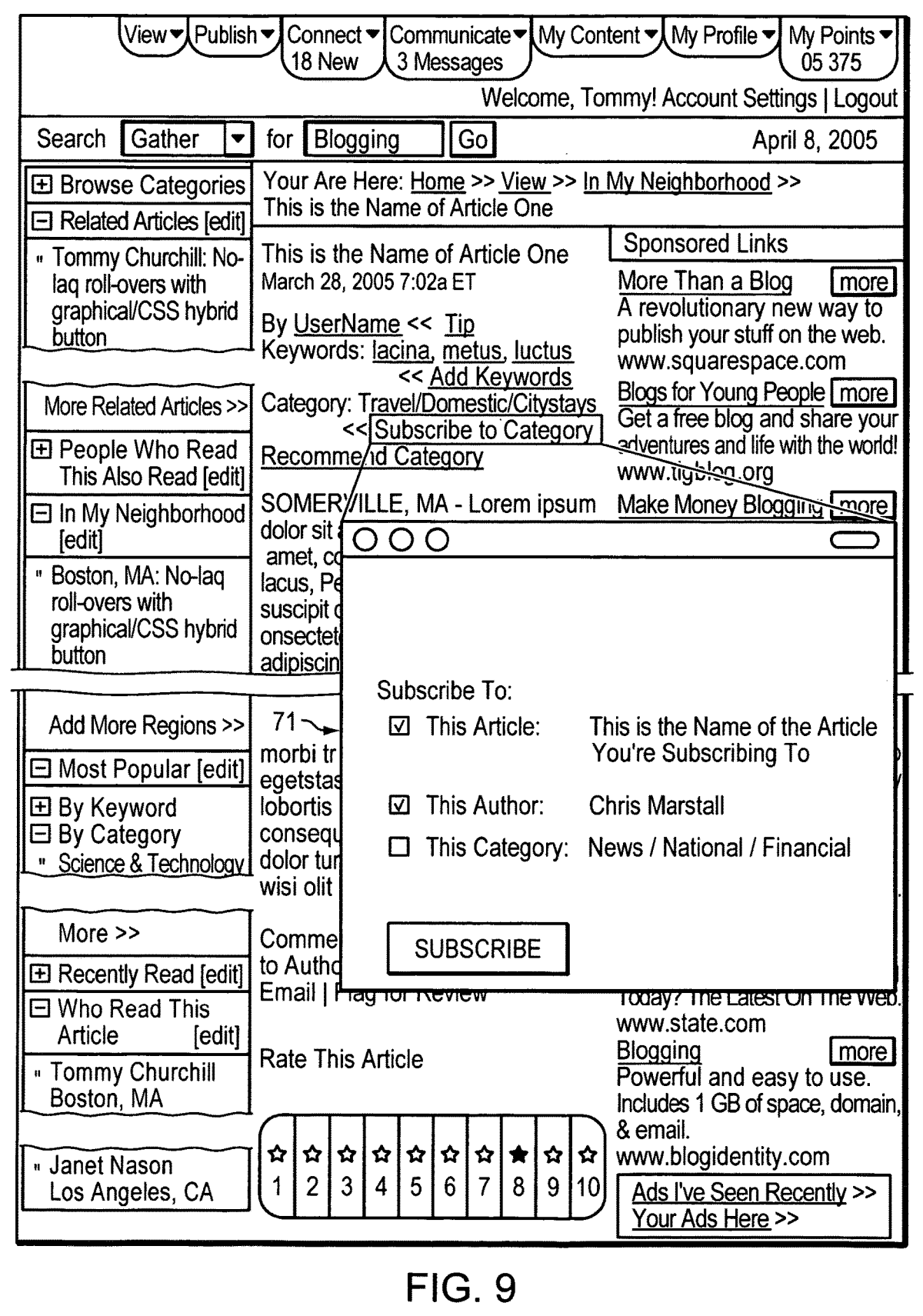

The user's home page 51 (or initial screen view by view operation 27) may also include indications of subscriptions 71 (FIGS. 2a, 4a) by the user as supported by user tables 122. The system 100 preferably allows a user to subscribe to other people, other users of system 100, topics, groups, authored works 29 and tags or taxonomy categories and the like. FIG. 9 shows an example graphical user interface enabling a user to subscribe to the content of another user, to the content by all users under a common topic area, and/or to content published to a group of users. Based on user input, system 100 records subscriptions in respective user tables 122.

The user's home page 51 includes an indication of groups 73 (FIG. 4*a*) the user belongs to, displays photos 75 of interest to the user, provides podcasts 77 (FIG. 2*a*) and user file uploads 72 (FIG. 2*a*). User tables 122 support display of this data.

The system 100 automatically refreshes home page 51 of users on a preset frequency (after a preset period of time has elapsed). Refreshing the screen view 51 brings in new content and advertisements.

Tables 5a and 5b are the supporting data organization and structure of home page 51 in a preferred embodiment.

Table 5a. Member Home Page 51

Members have a home page 51. This home page displays all member information to the member himself and all public information to other members determined by their privileges.

Table 5b. Standard Home Page for Known (Registered)/Unknown Users

A standard home page 51*a* (FIG. 4*b*) is displayed to known and unknown users. The information on this page aims at enticing the user to become a registered member. This page 51*a* contains:

Outline from featured articles.
Sign up/login capability
Browse tags or keywords
Search boxes that search either system site 60 or the web.
Current promotion for members (clicking goes to more info on promotions)
Most popular members (clicking goes to more info on membership).
Clicking on a member only shows minimal member information (First name, first letter last name, country).
Based on the profile information gathered about the known users, system 100 changes this page 51*a*. On this page 51*a*, system 100 preferably rotates from ads (e.g., ⅘ of times) to reasons to become a member (e.g., ⅕ of times). The ads shown are tailored based on the subject user's profile data gathered so far.

Continuing with FIGS. 2*a*-2*d*, publish operation/module 11 enables a writer-user to create a piece (authored work) 29

| Feature | Description |
|---|---|
| Display information based on privileges. | The home page shows the member's information to the respective member while other members can only see of this member what fit their privileges. |
| Customizable content and layout | The member is able to customize his home page 51. He is able to set what information he want to display and where on the page. However, he cannot prevent the headers (taxonomy, header and ads) from being display. The middle (content) pane display order and display location can be customized. |
| Home viewed by owner | The following information can be shown on the member's home page:<br>Top 4 latest articles published by the member with the newest at the top<br>Report summary on article viewing<br>User's connections that are currently online<br>Users connections<br>Articles recommended to the member by the system.<br>People subscribed to by the member with the ones that have the most recent articles (not red by the member) at the top<br>Groups the member belongs to with the ones that have the most recent articles (not red by the member) at the top<br>The members' contacts.<br>The members' bookmarks.<br>Member's recently read articles<br>Taxonomies subscribed to with ones that have the most recent articles (not red by the member) at the top.<br>Account balance |
| Home viewed by other member | The following information can be shown on the member's home page when viewed by someone else. Clearly, this information depends on who views the page and the information view properties:<br>The members' connections<br>Latest articles published by the member and not red by the viewer.<br>Shared groups the member belongs to.<br>Public bookmarks.<br>Public subscriptions.<br>Recently read articles |
| Taxonomy published under | Member should be able to specify the "taxonomies under which I publish" and the viewers can click on them which shows the articles written by member in that taxonomy. |
| Tags published under | Member should be able to specify the "tags under which I publish" and the viewers can click on them which shows the articles written by member in that keyword/tag. |
| URL for home page | Members home page can be accessed via simplified URL's containing both member name and system name. | formed of any one or combination of text, images, audio, video, files to download, XML descriptions of any of these items, comments and/or bookmarks. Further details are given below in FIGS. 3a-3d.

Figure 8B:
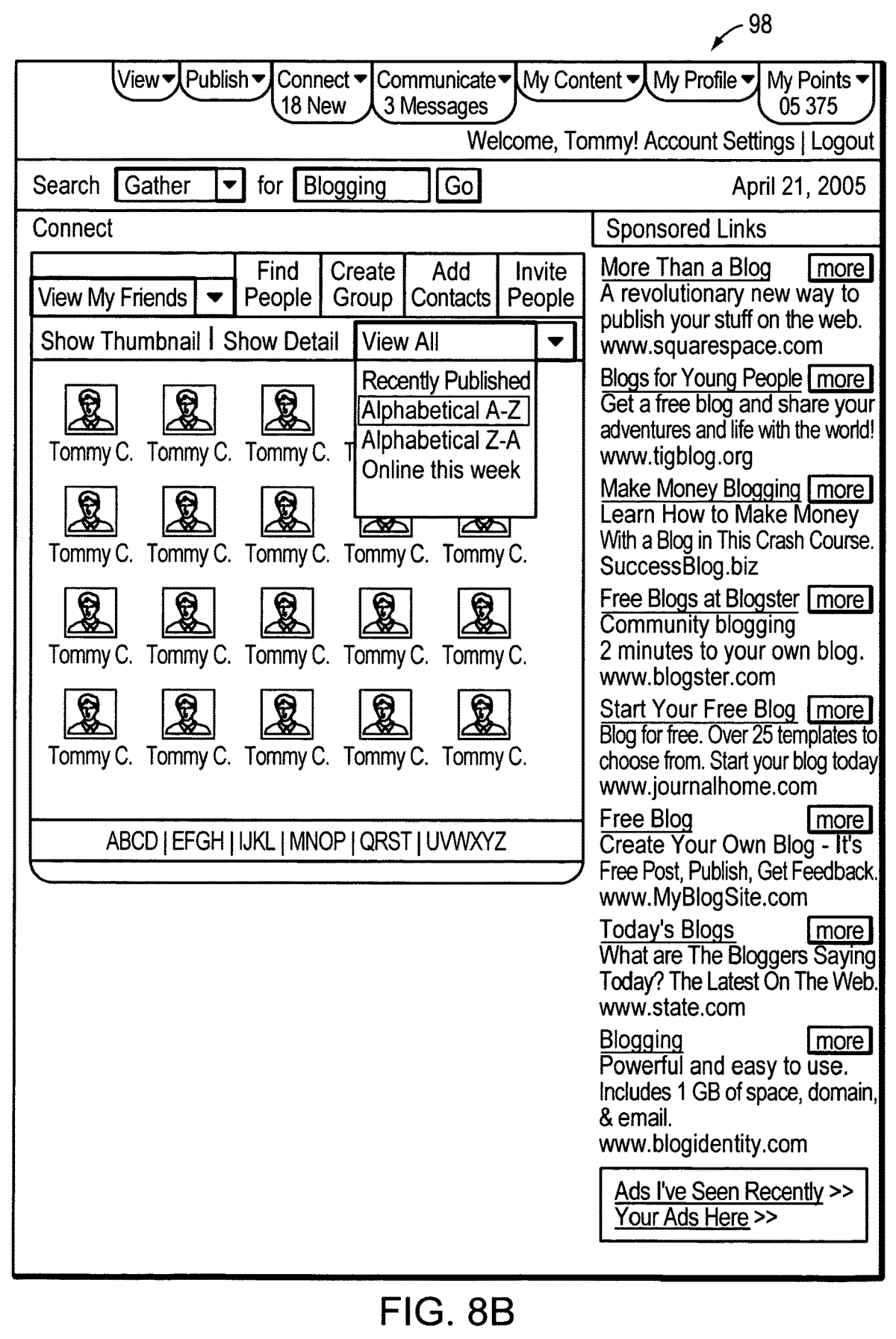
Figure 8C:
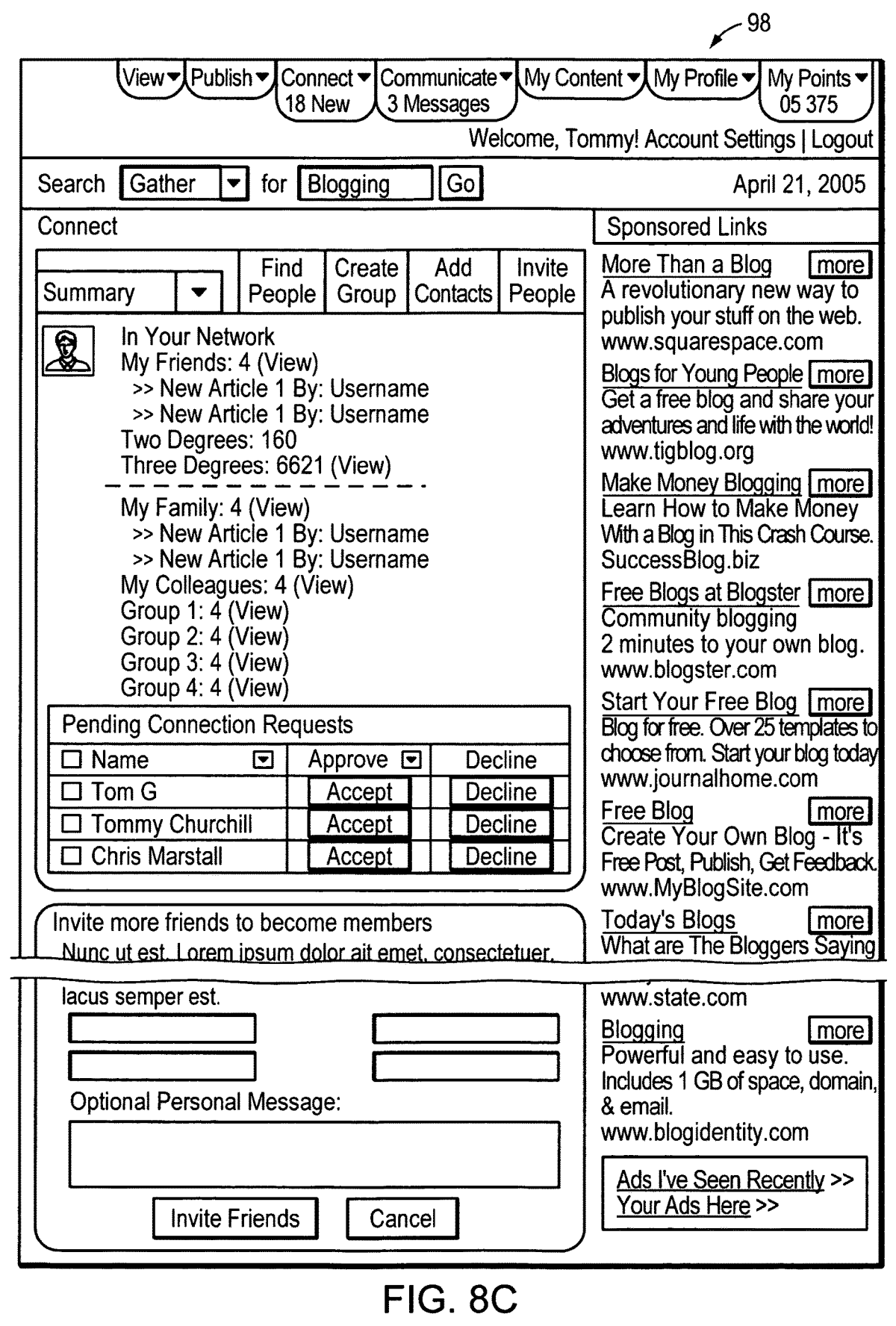

Connect operation 31 (FIG. 2b) is an address book of sorts which enables a user to specify categories and relations of people. Preferably each entry indicates one of the categories of 'family', 'friend', and 'work', and may thereby define subsets or groupings of people similarly related to the subject user. Connect operation 31 also enables users to organize groups, make a school grouping, find people and add contacts. Table 1 and the groups configuration discussed above support connect operation 31. FIGS. 8a-8c are further illustrative of a user interface 98 for enabling user-definition of connections (category and degree of separation) to other people. FIG. 8a illustrates connection categories of "Friends", "Family" and "Colleagues" as well as lists group names for user selection. FIG. 8b illustrates a next level selection (alphabetical) for the category of "Friends". FIG. 8c shows a summary level display of the three connection categories and indications of any new articles within those categories (organized by degree of separation).

Preferably communicate operation 33 (FIG. 2b) is an email service. Any of the known email software applications is suitable here.

Figure 2C:
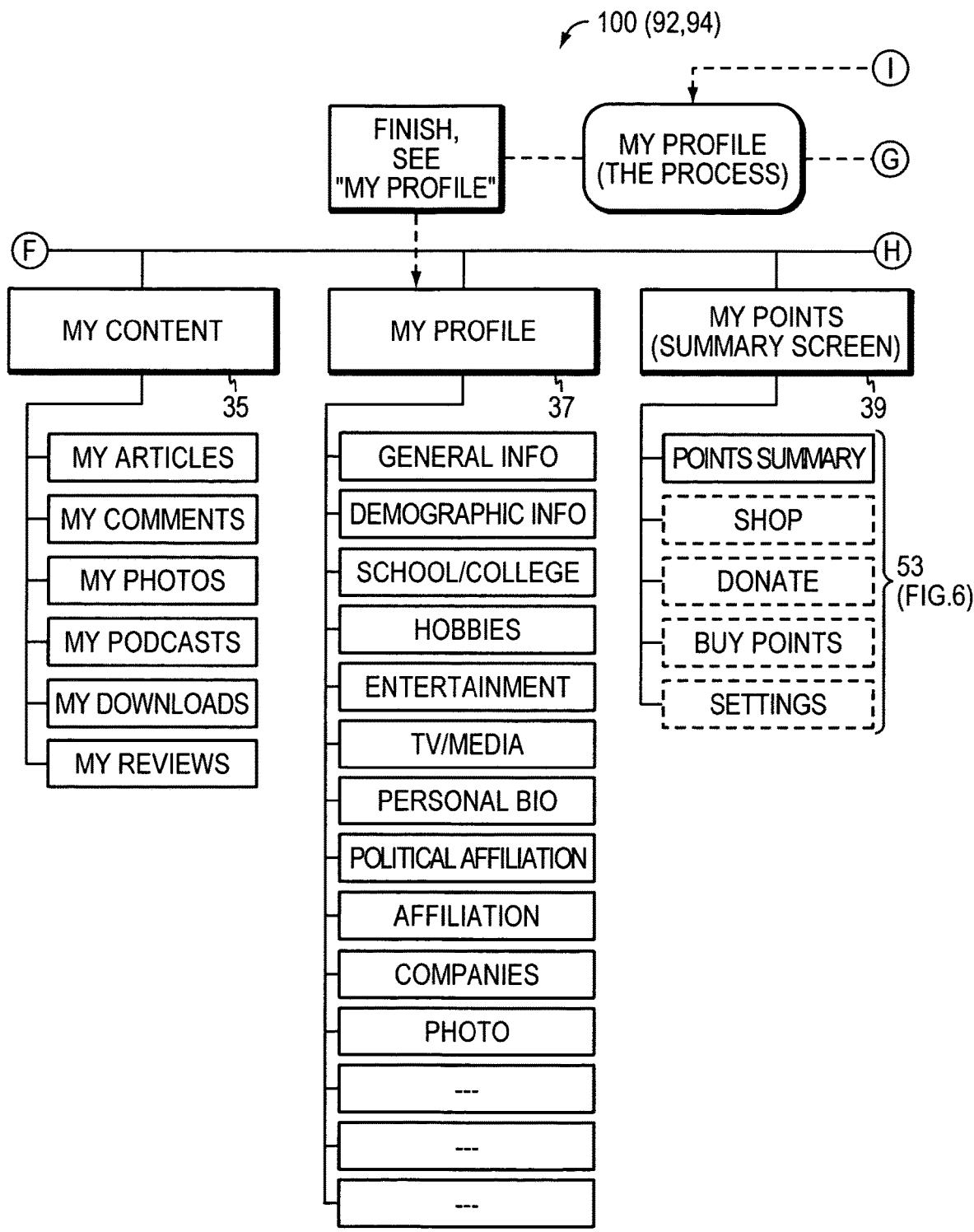
Figure 2D:
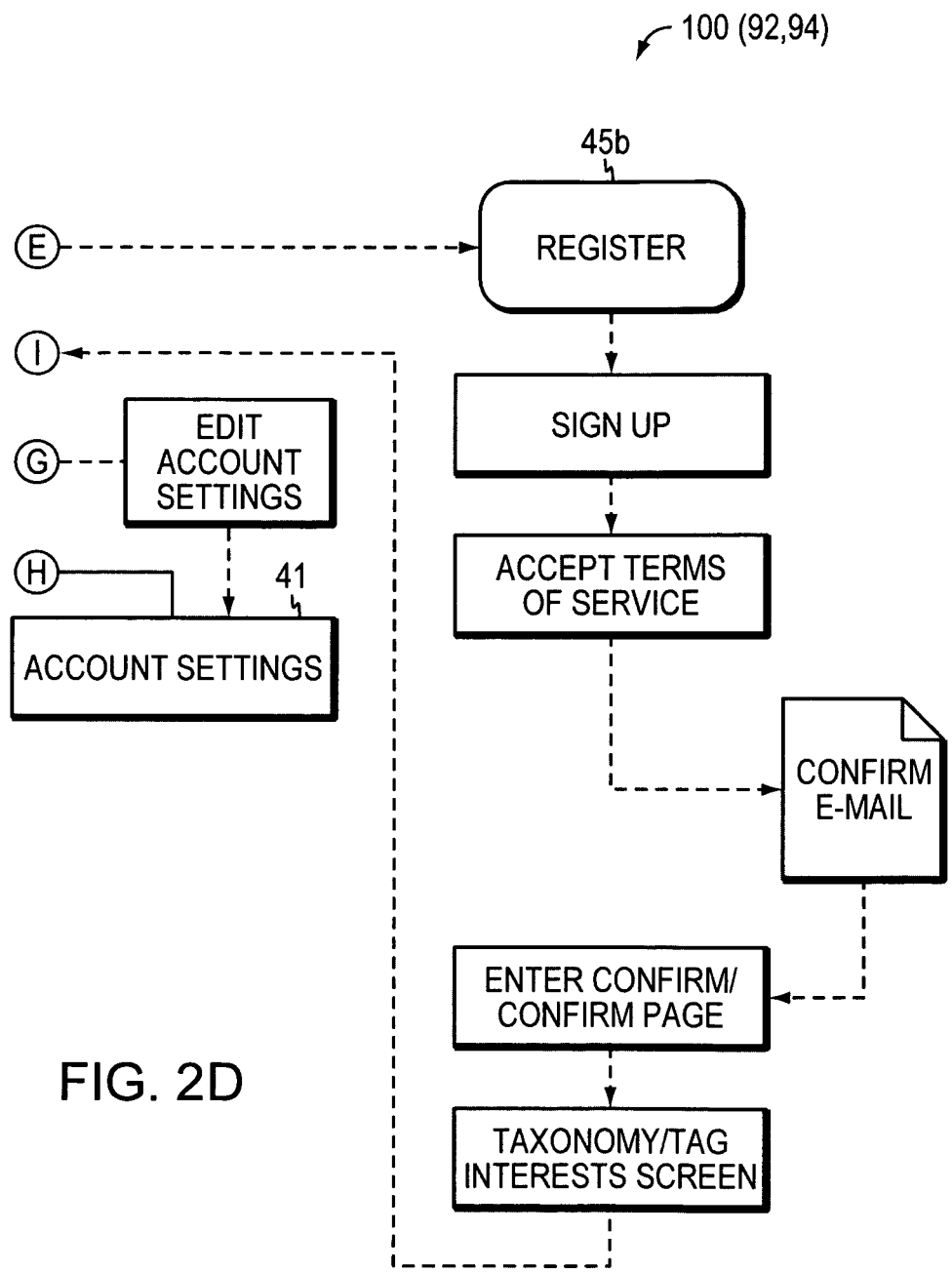
Figure 2E:
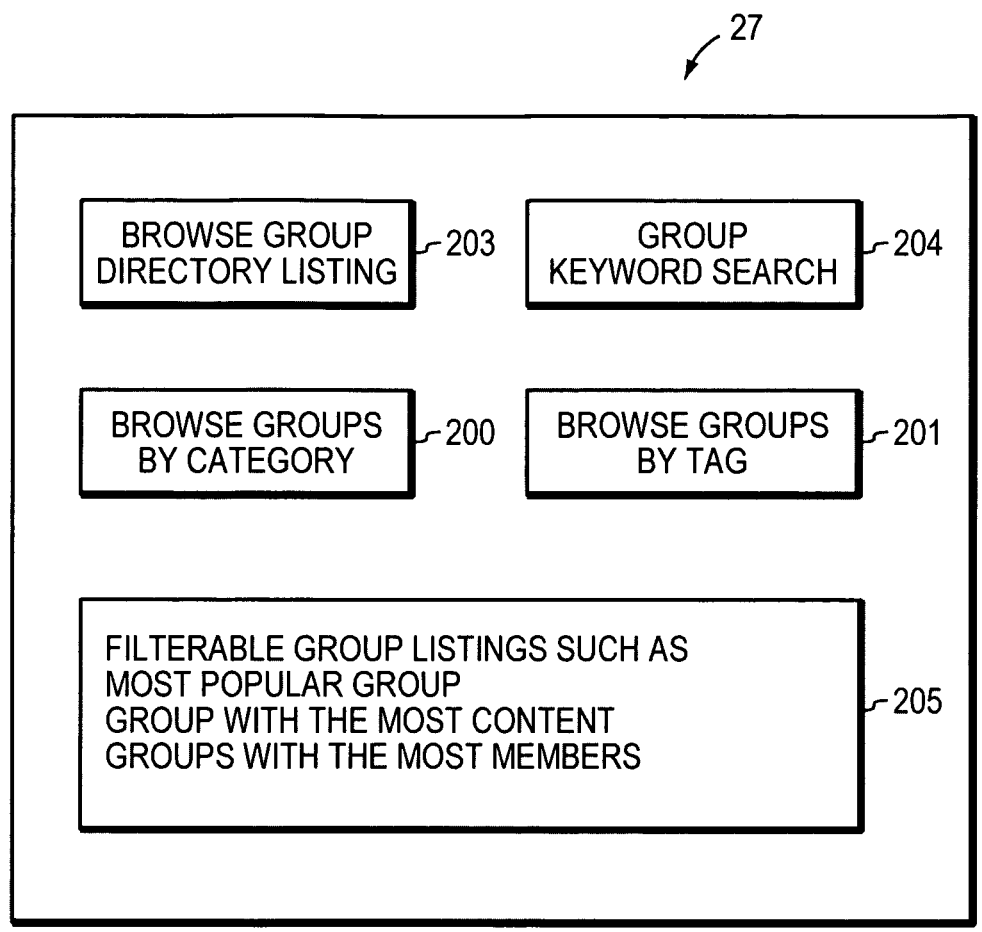
Figure 2F:
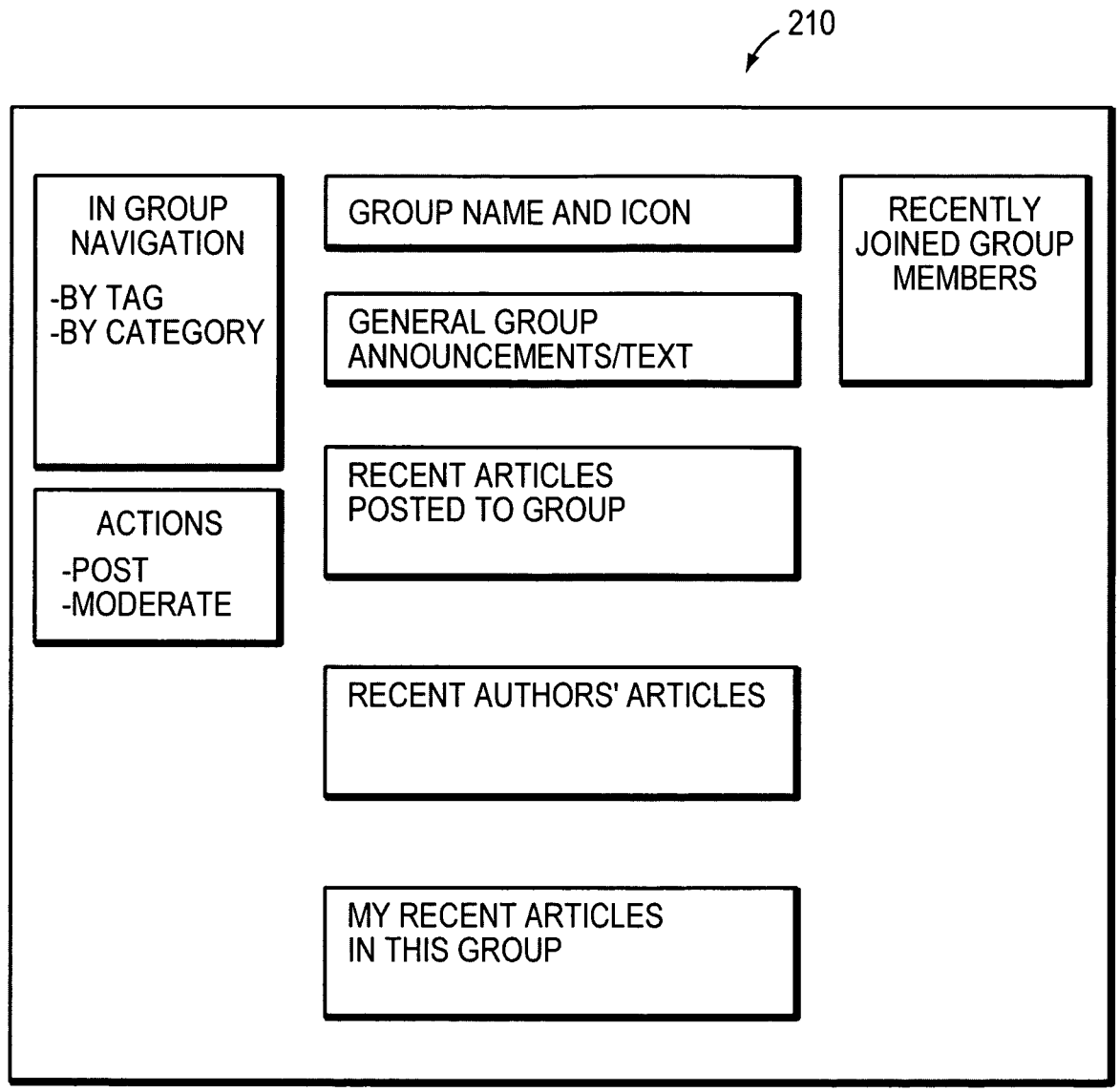
Figure 2H:
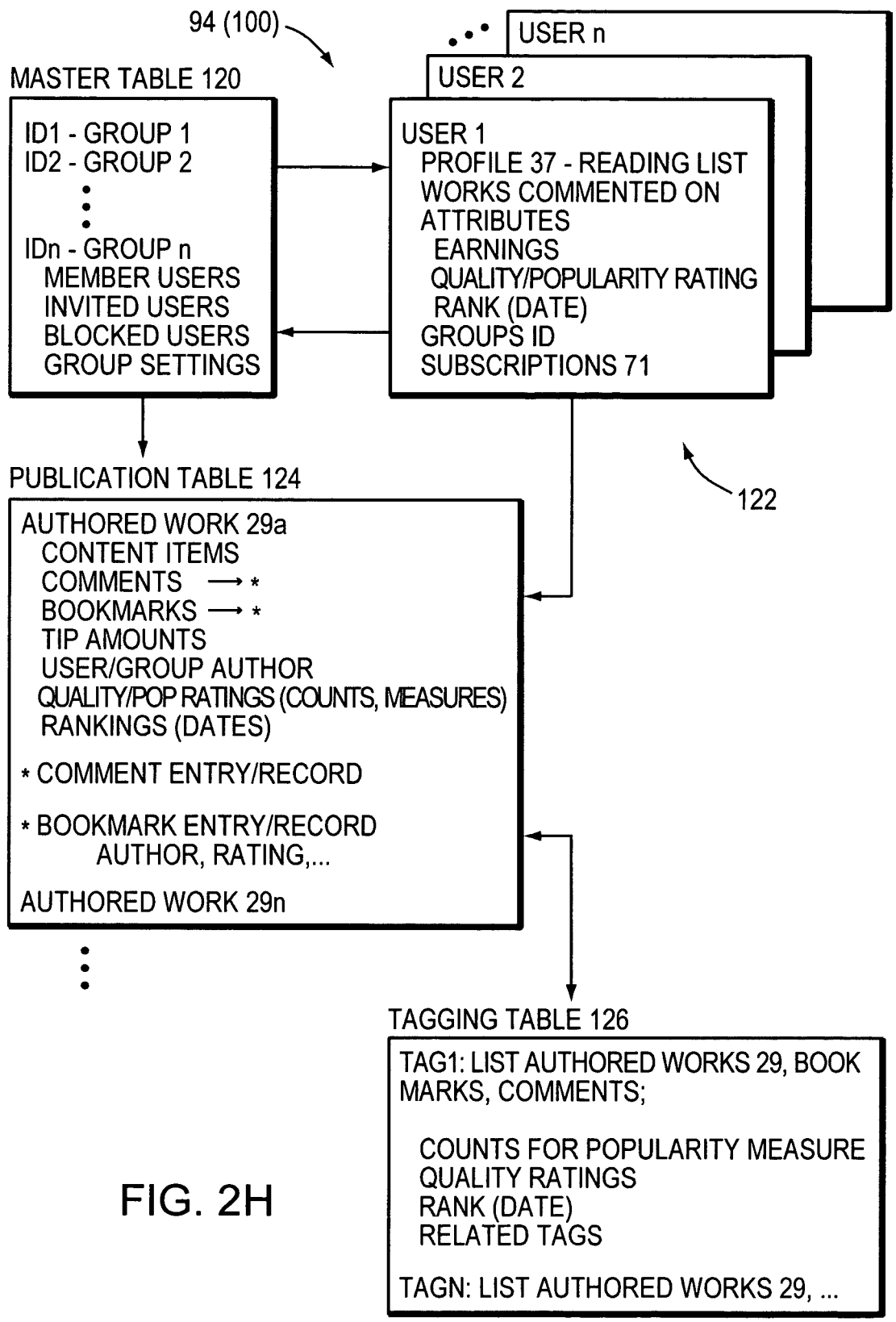
FIG. 2h is a block diagram of database tables supporting the preferred embodiment.

Continuing with FIG. 2c, My Content 35 stores a given user's published content 29 (e.g., labeled 'My Articles' and 'My Reviews') or elements for use in composing authored works 29. Included are images, audio files, multimedia clips, video clips, bookmarks, comments, download files and the like. Also My Content 35 includes comments the user has made on other's articles (works).

Accounting settings 41 also result from the user profiling (registration) process 45. The present invention system 100 is preferably a point based system. Known users can earn points. However, the points are not debited from a writer-user's account until the user becomes a member of system 100. Known users cannot redeem points unless they have subscribed to the system 100. If they subscribe using the same browser used when browsing, their accumulated points are transferred in their newly created account (because the points will be in the cookie for example).

A user's points and other related accounting is provided by points operation 39 (FIG. 2c). A report generator may provide various displays and output of data from points operation 39. FIG. 6 discussed later illustrates one embodiment.

Overall, the present invention system 100 is formed of (a) an author contribution mechanism, (b) a method and means for organizing user-contributed content and (c) a sub-system (or platform) for aggregated user publishing. FIGS. 3-10 further illustrate each of these aspects as described in detail below.

In general, the present invention provides a computer method and system (e.g., Website or portal) that enables individuals or organizations to publish content on a global computer network such as the Internet. The author-user composes and submits authored works through a composition module 11 (FIGS. 2a and 5) of the present invention software 92, 94. As shown in FIGS. 3a-3d, the composition module 11 allows the author-user to specify a title 40 of the piece and to select related tags and/or a category 42 (e.g., politics, business, science and technology etc.) for the current to-be-authored work 29. Composition module 11 provides a working window or other such area 49 that enables the author-user to embed hyperlinks, images, multimedia and the like. Note that the author may post just multimedia elements and nothing else, files to download, images, video, sound files including music, and may do so with or without accompanying text.

Further, the composition module 11 enables the author-user to categorize or classify the subject matter of the authored work 29 using keywords or a taxonomy which is standardized for all authors. Such keywords or taxonomy may be multiple layers deep as illustrated at 42 in FIG. 3b and may change from time to time. In addition, the composition module 11 at 61 suggests various tags and keywords to index the authored piece 29 based on user-writer's and others' authored works 29 in the same topic area (category). System 100 draws on tagging table 126 and publication table 124 discussed above in FIG. 2h to support this feature 61. These keywords 61 are used to allow users to search for content more efficiently, navigate to this article from other content with similar tags or see what general topic areas a user is reading or writing (when all tags across all of a user's writing or reading are brought together). The author may add to these tags, remove any or all of them or create his own replacement set.

In a preferred embodiment, the invention taxonomy and tagging 42, 61 provide disambiguation. For example, if a user specifies "Macintosh" the invention keyword/tag subsystem determines the subject term may mean a variety of apples in the cooking category, specifically pies, as well as a name in the computer category or related to graphics. In order to disambiguate, the tagging subsystem looks at each term "apple", "cooking", "pies", "computer" and "graphics". The term "apple" does not disambiguate between the categories of "cooking" and "computers" where the term "apple" has standard meanings in each of these categories. The tagging subsystem selects the two most specific, non-overlapping terms "pies" and "graphics" and displays these to the user for selection at 42, 61. This causes the user (his response and selection) to disambiguate the possible categories of the initially specified term "Macintosh". If the user selects "pies", then the invention software system determines cooking/pies/apple/Macintosh to be the corresponding tags (keywords).

Figure 7:
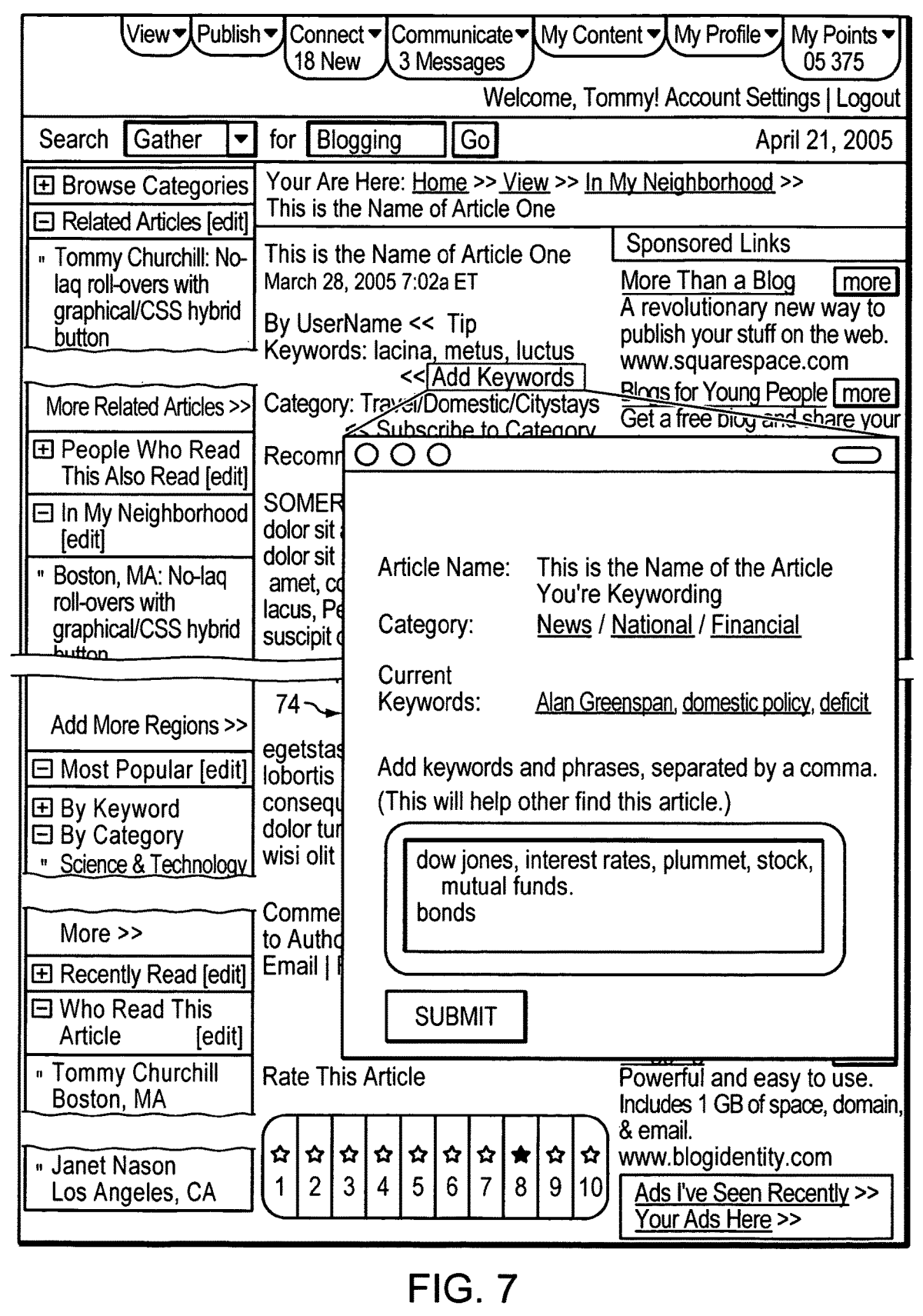

After the author-user has completed composing his subject authored work 29, he submits the authored work for publishing by the invention system 100 (via composition module 11). Once the work 29 is published, other users may "tag" this piece 29 with keywords as well. FIG. 7 illustrates a reader-user tagging 74 an article 29 published by another user (the author-user) in one embodiment. The system 100 may weight the author keywords and the other user keywords differently for any of the phrases listed.

Figure 3B:
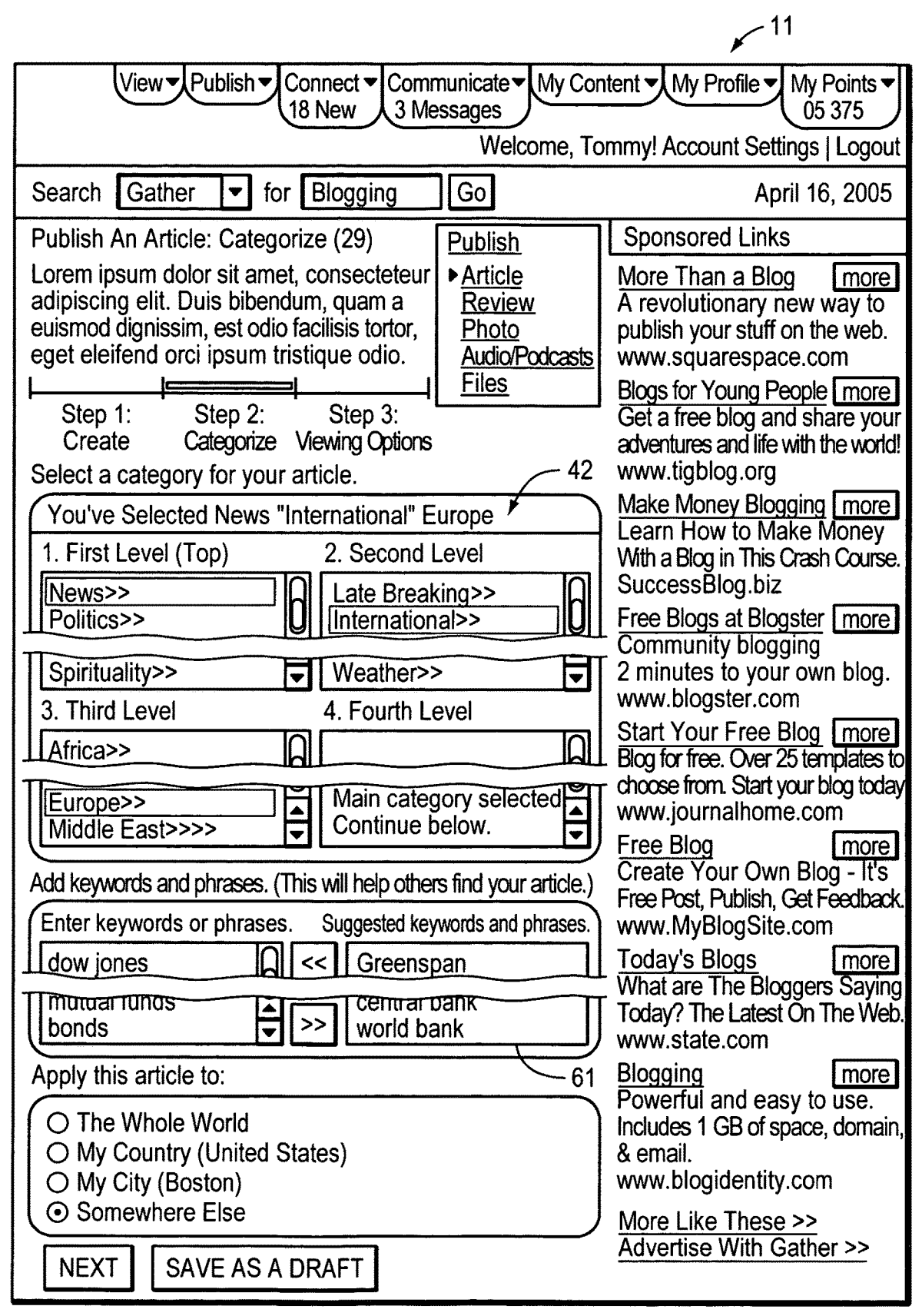

Also illustrated at the bottom of FIG. 3b, composition module 11 enables the author-user to specify geographic region of readers for the subject authored piece 29. General geographic areas as well as specific continent/country/city may be indicated in further (e.g., drilled down) windows.

Figure 3C:
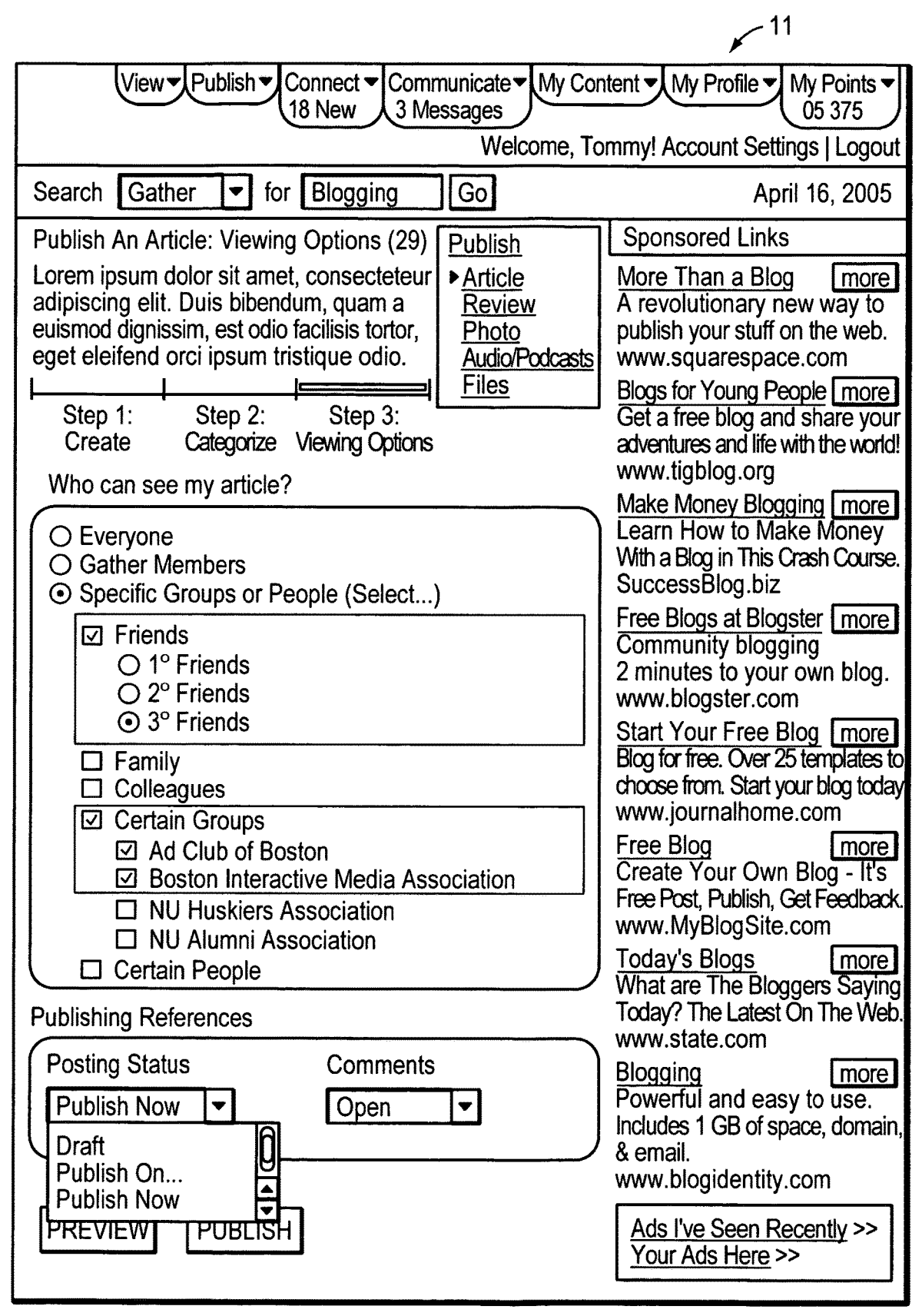
Figure 3D:
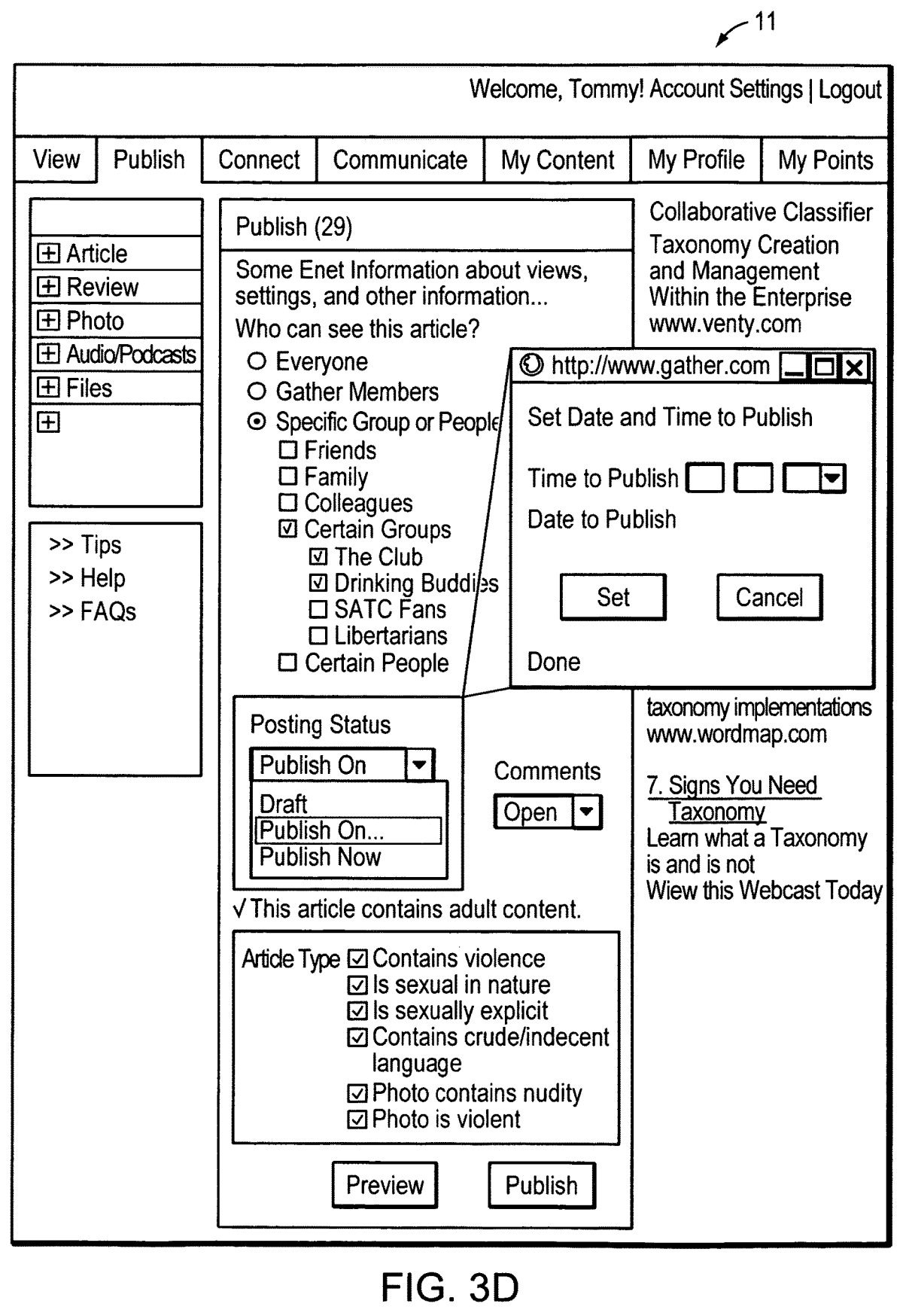

The present invention software 92 (composition module 11) enables the author-user to specify timing and circulation reach of the authored work. With respect to timing, the preferred embodiment enables the author-user to specify whether to publish the article live or save the authored work 29 until a determinable date. The bottom of FIG. 3c and the break away portion of FIG. 3d illustrate this. With respect to circulation reach, the invention software 92 enables the author-user to limit the readership audience of the particular authored piece 29 as illustrated in FIG. 3c and the bottom of FIG. 3d. For example, the author-user is able to select categories of readers such as friends, family, generic or other arbitrary groupings, including degrees of separation by such associations, or to specific or individual users, and make his article available to just those users identified. The author may also make his work available to anyone who has registered as a member of the Website/system 100, or to anyone using the global computer network 70.

The user interface of composition module 11 may further allow the author-user to specify adult content contained in the subject authored work 29 as illustrated in FIGS. 3a and 3d (bottom).

Reader-users (or a user in general) log into the invention Web site system 100 hosted by server 60 and search for specific content or browse for various content through invention software 92, 94 (search operation 25, view operation 27). As mentioned above, FIGS. 4a and 4b are illustrative of initial screen views 51 rendered by view operation 27 and displayed to the user. In a preferred embodiment, the reader-user subscribes 71 to content offered through the Web site/system 100 by any combination of author, topic, related people and/or groups/organizations as illustrated in FIG. 9. Users are also allowed to establish connections of different types with their family, friends and work colleagues that allow them to see (at 76, FIG. 4a) material written by these connections. Connection operation 31 through user tables 122 supports this function. Additionally, users may choose to see content published for their local area or regions to which they might travel.

As mentioned above in FIG. 7, reader users, when reviewing an authored work 29, may suggest alternative tags for that article that were not previously suggested by the author. The system compiles frequently suggested tags for this work, ranking them by frequency, and may add them to the authored work classification for better indexing.

Figure 4C-1:
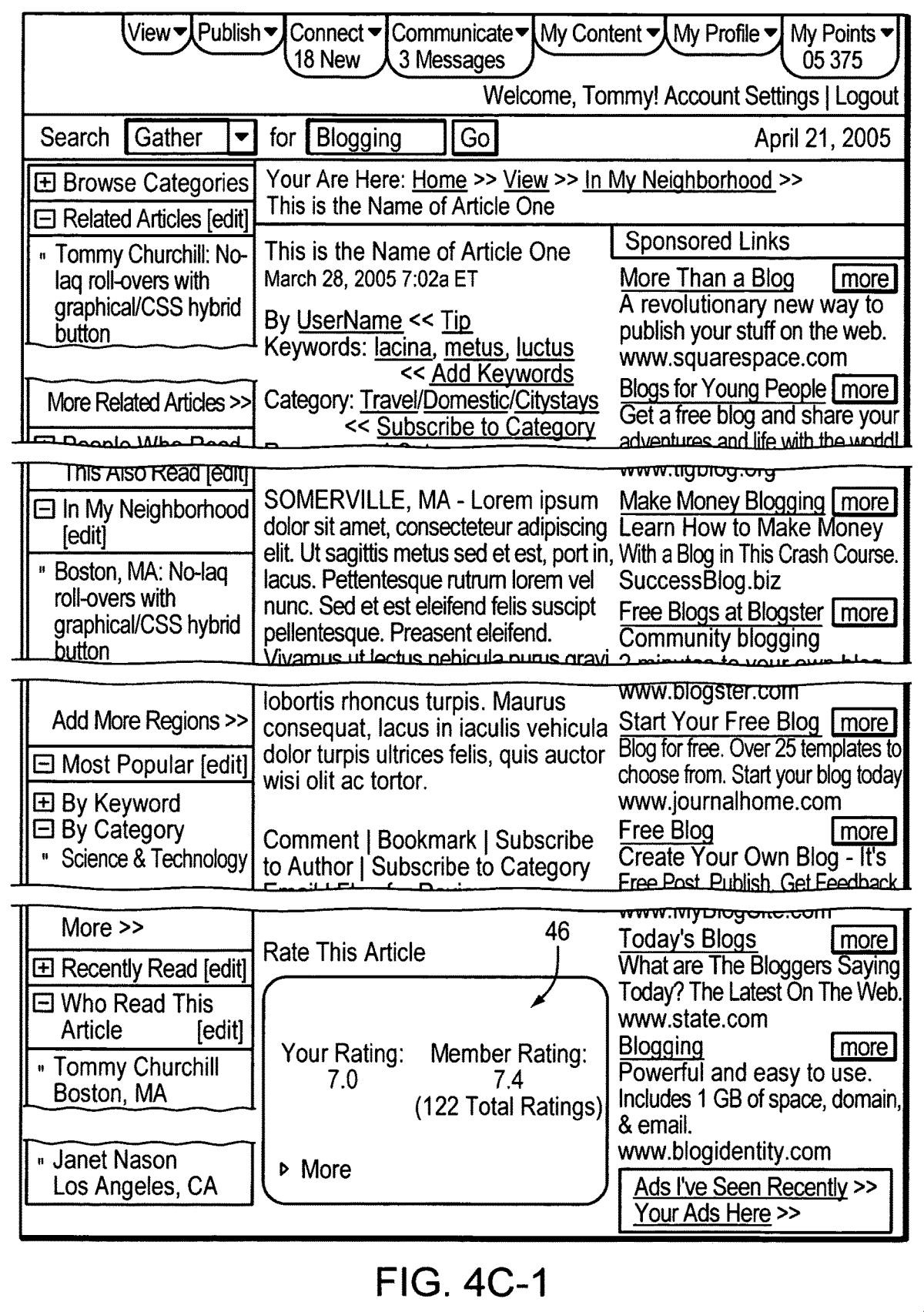
Figure 4C-2:
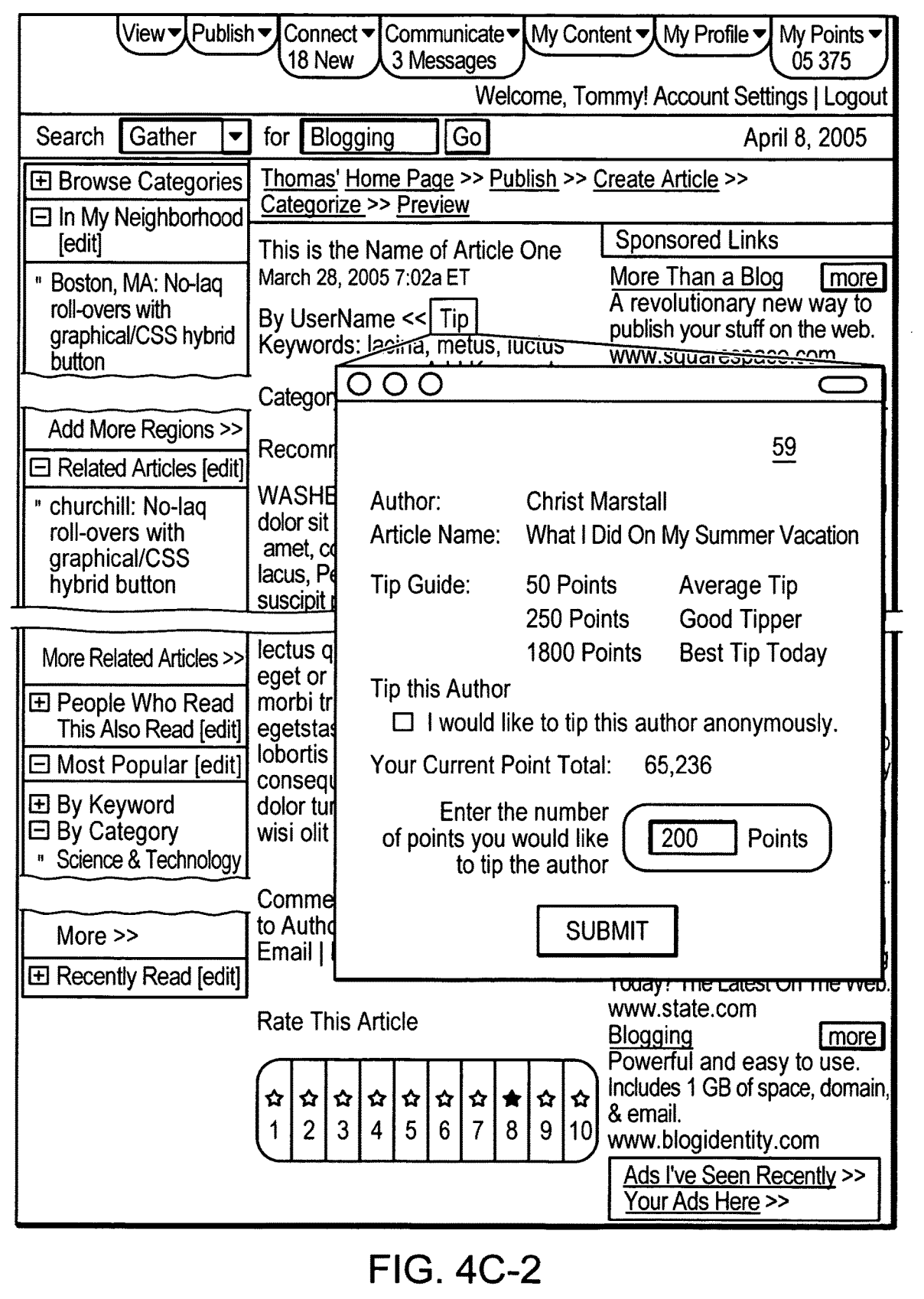

Upon a reader-user selecting an authored work published by invention software 92, 94, a reader module 13 (FIG. 5) collects ratings 46 from the reader. In a preferred embodiment, the ratings 46 are easily provided (by a single click) by the reader-user. FIG. 4c-1 (bottom) is illustrative. Multiple rating areas include distinguishing the piece (selected authored work) between serious and humorous subject matter, rating the writing quality, rating the presentation, rating to distinguish between conservative and liberal points of view, rating the suitability for different audiences or age groups, rating accuracy of facts presented, rating uniqueness of the author's perspective, rating quotability of author's content, evaluating the compliance with various standards, or determining how well an article was categorized. Ratings may vary by tag or keyword. One embodiment distinguishes between reader ratings and system personnel (expert) ratings.

A radio button indicator, slide indicator, numerical or other indicator next to each rating area is easily single clicked by a reader-user to effectively submit his rating in each of the multiple rating areas. Other user interfaces for obtaining reader ratings 46 are suitable.

A compensation module 15 (FIG. 5) determines quality of, popularity of and value to advertisers (revenue generated) by each authored work 29 stored at My Content 35 (FIG. 2c) of a user or group of invention software 92, 94. In particular, compensation module 15 determines quality as a function of the collected readers' ratings and popularity of an authored work. In one embodiment, popularity is evaluated based on the number of registered, non-registered and total users reading an article (traffic to the authored work 29), how often (number of times) that article is bookmarked, number of times the authored work appears in search results, number of times the authored work is commented on or cited in a email message or other authored work, number or amount of tips (discussed later) given to the authored work and/or how often the authored work is forwarded, recommended or emailed to another user. These factors are tracked via publication tables 124. In some embodiments, compensation module 15 uses one or more counts per user in determining traffic to the authored work 29 depending on membership to system 100. The compensation module 15 determines patterns of collected readers' multiple area ratings and therefrom traffics authored works accordingly on the Web site. The determination of quality may include a standardization of individual reader rankings relative to other readers. Further, the compensation module 15 detects barbell curves of collected and graphed rating data; or other such determinations may be made by the compensation module 15 using data analysis and techniques known in the art.

In one embodiment, the compensation module 15 measures quality, popularity and frequency of writing of an individual author. An author quality ranking may be based on measured quality of an author's individual works or average quality of his authored works, or the like (for example, as recorded or otherwise indicated in publication table 124 and user tables 122 of FIG. 2h). From these measured amounts the present invention is able to determine categories of topics (or tags/keywords) in which the author was rated highly more often than in other categories (tags/keywords) and thus make a determination that the author was better at writing on one topic than another. For example, the author user is rated for popularity based on measured popularity (total, individual or average, for example) of his authored works 29. Popularity of authored works may include a measure of relative traffic (in addition to all user traffic) to these works against other works on the system 100 website or other works similarly categorized/tagged, the number of times an article is forwarded or bookmarked, and/or a popularity rating from other users. Traffic to an authored work 29 may be measured by a combination of registered system 100 users and non-registered system 100 users viewing the authored work 29. Compensation module 15 tallies one count toward popularity of the author user per counted user viewing.

In one embodiment, compensation to an author user is calculated as follows:

$$\text{author's compensation} = (A*X)S$$

where A is total system user compensation, defined as all ad revenue acquired by system 100/host 60 in a certain time period multiplied by a designated percent of ad revenue to share.

X is percent or portion of total system user compensation budgeted for awarding to author-users of system 100.

S is a given author's share, and is defined as the ratio of number of views of all authored works 29 by this author viewed in the subject time period, to total number of views of all authored works 29 of system 100 (all author users' works) viewed in this time period.

Different embodiments may also employ fraud prevention techniques/routines to prevent author users from increasing the number of views of his own works 29, etc.

The foregoing compensation calculation may be across all authored work 29 types (i.e., bookmarks, text, photos, etc.) or portioned (allocated) separately by type (e.g., a text reward amount, a photo reward amount, etc.) to the author user.

Preferably, the author user is rated for popularity and quality across all content or per tag area. Similarly each authored work 29 is rated for popularity and quality across all content or per tag area.

Optionally compensation may be calculated on a flat fee basis. For example, if the authored work is read one time, then compensation is set at a specified (predefined) dollar amount and if the authored article is read another predefined number of times, then a different dollar amount of compensation applies.

The system 100 stores the calculated compensation amounts in a running tally as "earnings" in user tables 122. User tables 122 then support system 100 in displaying to the user a compensation summary 88 for his contributions (published works 29) in the system. FIG. 6 is illustrative.

In a preferred embodiment, the compensation is paid in either points or currency units depending on user or system settings/preferences. Points Operation 39 (FIG. 2c) supports this feature/aspect. The invention system 100 can offer to convert points to currency units or pay users in currency units, based on user preferences or based on minimum earning thresholds set by the system software 92. Applicants' approach is to pay the author based on the value that he creates in the readership community at large. For example, when a content item is viewed by a reader-user clicking on (or otherwise selecting) a page, if that page is a group or user page, that group or user is awarded points for the referral.

In one embodiment, compensation module 15 awards points to an author user or group for a subject authored work 29 dependent on the value of advertisement adjacent the subject authored work. Value of advertisement here is defined as a function of revenue generated by or advertising fees received for that advertisement regardless of whether that advertising fee is gained through the appearance of an advertisement, click through on that advertisement or sale resulting from that advertisement, for example. In turn, compensation module 15 determines specific ad values for an authored work 29.

In a preferred embodiment, compensation module 15 awards points equivalent to a percent of advertising fees received for the advertisement displayed adjacent to the subject authored work 29 or based on the number of advertisements appearing next to the subject authored work that are selected by reader users. In some embodiments, system 100 (compensation module 15) tracks and stores this information (advertising data) and enables the author-user to view which articles 29, keywords, tags, or taxonomies were targeted by the advertisement displayed adjacent to the subject authored work and to view the advertising fees of the advertisement and hence value of the advertisement to the author user.

As part of a financially sound overall plan, the amount of pay to the author user may be limited as a percent of the revenue generated at invention Web site 100/host 60 or as a percent of a budgeted amount as discussed above. Further, all authors may not be compensated similarly. Bonuses may apply to certain authors over other authors. Likewise, a multiplier may be used for certain authors over other authors. FIG. 6 illustrates a points transaction (accrued and withdrawn) history screen view 53. In one embodiment, the compensation module 15 displays to the author user total earnings and average earnings relative to other author-users in the system 100. This may be displayed per topic area or across all topics. In some embodiments, this is done either by showing average comparisons or by telling the author-user her rank (403 out of 30,302 writers in the food category).

Points earnings screen view 53 and a user interface for converting points to currency units provides a segue into on-line shopping. Advertisers 47 and other affiliate merchants to the present invention system 100 provide various links, product advertisements and the like to the user through screen view 53 (among other screen views of points and/or currency units equivalents). Targeted advertising may be had here due to user profile 37 (FIG. 2c).

A reporting subsystem 17 (FIG. 5) is coupled to the compensation module 15 and enables various compensation calculations to be reported, such as in FIG. 8, as well as authored works 29 ratings (collected reader ratings) and other determinations of the present invention software 92, 94 according to accounting settings 41 (FIG. 2d), to be reported to the author-users. The author-user can look at an authored work 29 that he authored (published through system 100) and see indications of individuals (e.g., by name) or groupings of readers (e.g., by group category) who have read the authored work 29. Likewise, users of the system can look at an authored work 29 (published through system 100) and see (i) general indications of people who have read/visited (clicked on) the authored work 29 and (ii) indications/comments of other works 29 that those people have read. This is supported by publications table 124.

In a preferred embodiment, a user can view from his home page 51 (FIG. 4a) indications of what his connections (friends, family, coworkers and groups) are reading 55. User tables 122 and publication table 124 support this function. Common relational database techniques are employed.

In another feature of the present invention, the compensation module 15 further effects the ordering of the publications stored in the composition module 11 and/or My Content 35 for deployment in the reader module 13 based on reader ratings 46. The publications are ordered by relevance, popularity, quality or number of times each item has been commented on, bookmarked or forwarded. This is accomplished using publication table 124 for tracking reader ratings (e.g., relevancy, rating, popularity and quality ratings) per authored work 29. Thus as a reader navigates through lists of possible publications to read and submits various search queries (via search operation 25), the present invention 92, 94 provides search results 43 (FIG. 2a, FIG. 4d) ordered by relevancy, popularity and/or quality as determined by reader ratings 46. In addition, the present invention may include, in ordering search results and content listed within taxonomical categories or as related to individual keywords (tags), aspects such as the individual reader-user's profile 37 (e.g., conservative . . . etc.) as stored in user tables 122. For newly authored works 29, editors of the invention Web site/server 60 rank and rate the authored piece. Also the present invention may employ a rule that reader-user ratings 46 are effective only after a minimum number of readers have submitted ratings on the authored piece as illustrated in FIG. 4c-1.

In a preferred embodiment, for each authored work 29, compensation module 15 effects display order of the authored work based on obtained reader users multiple area ratings and determined article popularity across readers. This display order is utilized for displaying order within taxonomical category, order within tags (keywords), order within category of subject matters of authored works, order within hierarchy of website 60, 100, order within query results, order within works related to topics local to the reader, order within a list of articles published by people to which the user or group is related, and/or order within a list of subscriptions 71 the reader has registered.

A filter in one embodiment filters out authored works of (rated as) low quality such that search results omit or demote low quality, authored works 29. If the subject authored work is rated better than another authored work based on obtained multiple area ratings and observed popularity, then the rating module (part of compensation module 15) promotes the subject authored work through a hierarchy of the system 100 ahead of said other authored works. Such promotion is performed on a site-wide basis, within a taxonomical category or within a list of authored works related to a keyword or set of keywords. The rating module further identifies to editors of a website the promoted authored works such that the authored works may be further promoted and/or featured on other parts of the website or in email, etc.

In certain embodiments, the rating module enables a reader user to indicate an authored work as miscategorized, mistagged, in violation of copyright or in violation of other standards. If an authored work 29 is cited more than a threshold number of times (e.g., a predetermined number or a percent of readers viewing the authored work 29), then system 100/rating module places the authored work under review. If an authored work 29 is indicated as being mistagged, system 100 initiates any of: removal of the authored work, citing the authored work as having an illegitimate tag, and removal of the illegitimate tag. System 100 further enables review of author of the authored work for abuse of tags and/or review of the reader user who indicated the authored work as being mistagged Further, the present invention may rotate the total number of stored authored works 35 by using an expiration threshold or other removal/substituting techniques. For example, certain topics may be time dependent or current event dependent on world or local news. Authored works on such topics are removed from the stored collection 35 as appropriate. Similarly authored works 29 of different tags (keywords) expire at different times. If an article 29 is not receiving reader attention, then the article may be removed from featured pages on the Website, but available when users search for content related to its topic/key words or navigate to the author's pages.

Figure 5:
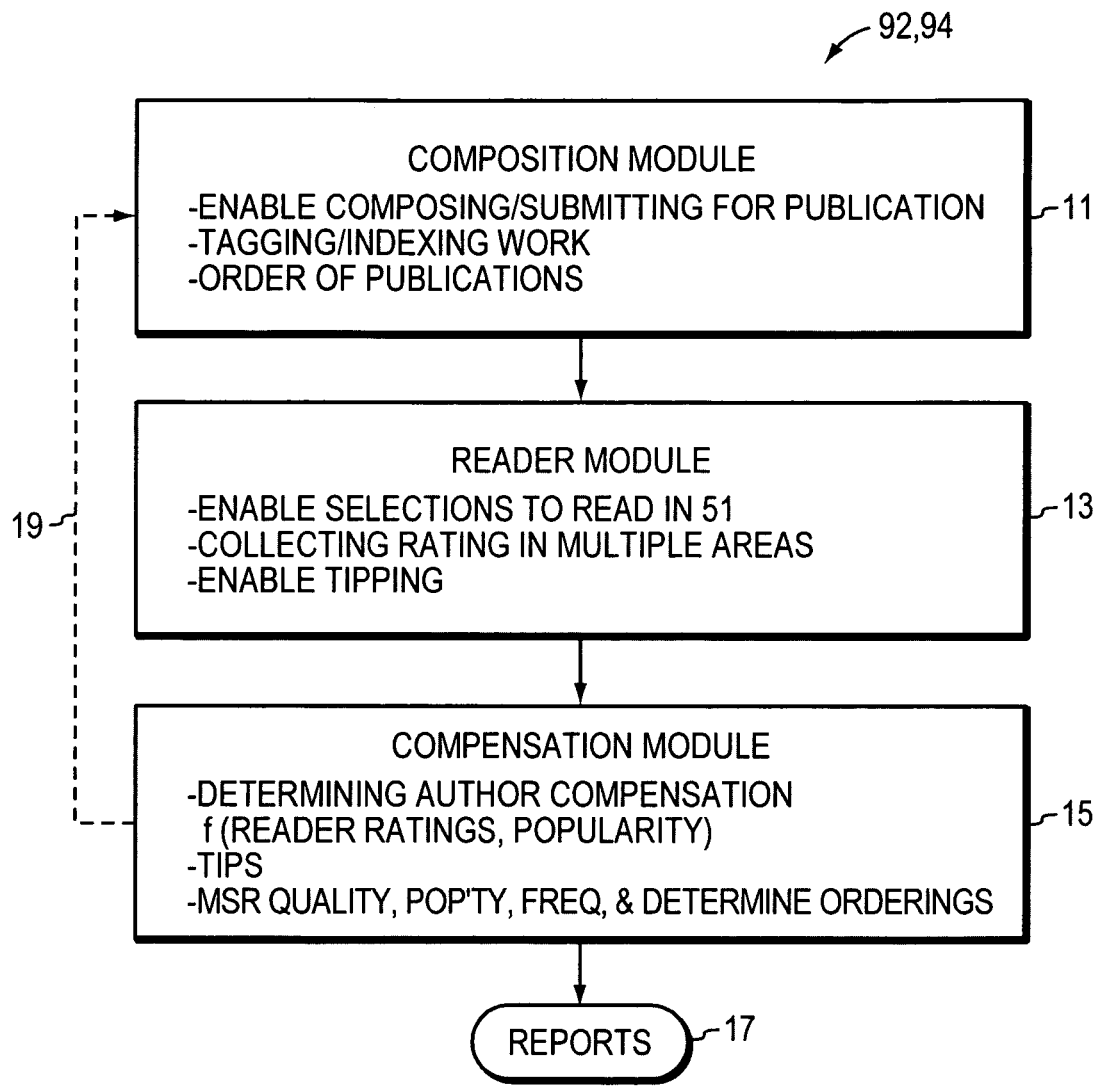
FIG. 5 is a system diagram of one embodiment of the present invention.

Operations of the present invention software 92, 94 to effect each of the above two features (ordering and rotating stored authored works in 35) are represented by the dashed line 19 in FIG. 5. In one embodiment, software 92, 94 determines an expiration threshold (upon which to rotate authored works 29) based on: a predefined number of times the authored work 29 has been seen by overall reader-users of system 100, a predefined number of times an authored work 29 has been seen by an individual reader-user, a predefined date and time and/or elapsed time since the authored work 29 was published. Reader-users may include registered users and/or non-registered users of system 100 where registered users may be weighted differently than non-registered users.

Thus, the present invention creates a thought marketplace where an authored work is promoted based on popularity and quality as rated by the readership (audience at large). In turn, the more highly the authored article is promoted (at 19), the greater chance that more readers will read and rate the authored work. This leads to higher compensation for the authored work. Thus the present invention aligns compensation of what is written with the readership value (popularity, quality) of the article rather than at the prior art industry standard rates which pay about $0.50-$1.50 per word or per project, (e.g., $5K-$15K per book, $40-$200 per journal story, etc.)

Similarly, in one embodiment, system 100 ranks or orders authors relative to each other, ranks authors within a topical or keyword area and/or ranks each author generally. The foregoing calculations providing a quality and/or popularity measure are used as a basis for ranking author users. Preferably the content management subsystem 35 performs this ranking and supporting calculations, and then provides the author rankings to the compensation module 15. Compensation module 15 displays to an author user his author ranking among rankings of other authors. This may be displayed as a percentile or as a count of rank levels (e.g., second quartile, third decile, . . . ).

In certain embodiments, the author rating module or means ranks authors based on any combination of: recency of authored works 29 (may be weighted average, for example), topic-specific popularity of authored works 29 (may be weighted average, for example), topic-specific quality of authored works 29 (may be average), and rankings over a period of time as indicated in publication tables 124 and user tables 122.

Further, in one embodiment, system 100 displays a list of authors with fastest increase in rank and authors with fastest decline in rank. This is supported by content management subsystem 35 and/or compensation module 15 tracking changes in (delta of) author rankings in addition to calculating individual rank. Change in author ranking may be based on any one or combination of: quality rating of the author, popularity rating of the author and popularity rating multiplied by quality rating.

Optional Tip

Another feature of the present invention involves allowing reader-users to tip (optionally pay a gratuity to) the author. At the end of an article, the present invention 92, 94 provides a web page 59 (FIG. 4c-2) that invites the reader to tip the author. The present invention system tracks and tallies the tips (e.g., via publication table 124) and includes these as payment to the author (in currency units or points). Here, user earnings, either as points or currency units, are held in an account for the user and represented in online points or currency unit ledgers like in screen view 53 of FIG. 6. To transfer points from one user's account to another user's account, the system simply debits the requested number of points from the tipper's account and places it in the account of the user being tipped. Here, both users would see the transfer on their ledger (view 53). The system allows the tipper to disclose her identity or remain anonymous on each transaction or by default for all transactions.

Further, in one embodiment, system 100 may display to reader users an average payment an author has received as averaged across all of his authored works and/or a maximum payment an author has received for an individual authored work 29. Publication tables 124 and user tables 122 support these operations utilizing common relational data techniques. System 100 may further group and list authors having similar average and/or maximum payment sizes, and display indications of relative sizes of payments and and/or actual maximum payment. Likewise, system 100 reports to author-users which authored works 29 or subjects they have received the greatest volume of payments, the greatest average size payments, and the greatest total payments. The average or total payments are a metric for quality of author measurement and/or quality of author measurement and/or quality of authored work 29 measurement. Total of payments is a metric for determining popularity of the authored work and/or author. System 100 may further calculate authors' earnings per word based on payments and/or other points awarded by the system. Publication tables 124 and user tables 122 along with common relational operations are employed in these calculations. System 100 also may calculate author's earnings based on advertisement appearing next to authored works 29 by the author.

Content/Ad Scarcity

Another feature of the present invention system 100 is the determining of where content is in short supply based on taxonomy or keyword, done by finding a high ratio of search queries (at 25, FIG. 2*a*) with correspondingly low click-through rates on content found on the system 100. The invention system may also identify frequently searched terms, phrases, taxonomical categories and/or tags that are most popular, and where users are publishing most frequently.

In a preferred embodiment, content scarcity is defined as user demand for content (of a certain keyword)) exceeding content supply (in that keyword). For each keyword, system 100 tracks the number of searches performed involving that keyword, and tracks the number of articles (authored works 29) published having been tagged with that keyword. System 100 computes the ratio of tracked number of searches or the number of times a keyword is used to browse to tracked number of published articles per keyword (as given by tagging table 126). The ratios that are relatively high amongst all ratios demonstrate a content scarcity.

Similarly, system 100 defines advertisement scarcity as advertising demand exceeding content supply. For each keyword, system 100 tracks the number of ads targeted in that area and counts (tallies) the number of authored works 29 in that area based on tagging table 126 records. System 100 computes the ratio of tracked number of ads to the number of authored works per keyword. The ratios that are relatively high indicate an area (keyword) of ad inventory scarcity.

The system determined areas of content scarcity may be useful to an author-user indicating what topic to write on next and/or what media type to compose next for a group or as an individual in system 100. The system determined areas of ad scarcity may be useful to advertiser users in placing ads on the system 100.

Another feature of the system 100 is to identify what content areas are of higher value to advertisers 47 than others. Here, reporting demonstrates (i) either the actual or relative value of keywords, (ii) keywords or tags that are generating the highest advertising revenue per article view, (iii) which tags (keywords) are generating the highest traffic per article 29 published, and (iv) which tags are generating the highest advertising revenue per article 29 published. This feature may be combined with the feature described above to show areas with little content (low number of published works on a given subject matter), but high value, encouraging users to write additional content (articles/pieces) in these areas.

In a preferred embodiment, system 100 links an authoring subsystem to a keyword or keyphrase targeting advertising system. In turn, such a system 100 enables author users to identify what content they may create that will (1) attract users that are most easily monetized and (2) bring the highest return on authored content to provide an incentive for author-users to create content (authored works 29).

Further, such a combined system 100 provides variable compensation to contributing users based on their success. That is, the system 100 preferably links points compensation for content creation not just to the popularity of the content but also to the value of the content to advertisers. System 100 allows writer-users to find out what categories/keywords are most interesting to advertisers, where market demand dictates value of the content in those categories/keywords.

Today, current search/ad players calculate inventory for certain ad keywords for the purpose of letting an advertiser know what ad inventory is available by looking at how many (average) advertising calls were made on recent days and how many clicks (number of times user selected) resulted. A similar calculation is used by system 100 to determine the scarcity of various advertising inventory (ScarcityFactor).

This ScarcityFactor, multiplied by the average click-bid for a given keyword applying to the content, multiplied by the likelihood of a given keyword to appear determines the value of each appearance of the content page in question.

Reporting on this multiplier (and ranking the keywords most valuable and most targeted by their respective multipliers) advises system 100 users where they can derive the best results for their content submission.

Dividing this multiplier by the number of articles submitted with the keyword in question within the past X days shows a user where the highest opportunity for individual earning can be found.

Thus the present invention provides a system that shows all content authors (and/or consumers) what content areas or keywords provide the greatest financial return system wide.

In order to prevent the point system from growing out of proportion of the revenue of the invention Web site 100, Applicants keep Web site revenue and points aligned. The projected web site ad revenue per day is calculated as an average of the ad revenue of this same day of week over the last several weeks, or may be considered as an average or median of a number of days in a prior time period. The projected site ad revenue per day is multiplied by a percentage of the revenue reserved for author-users' compensation. This percentage of the projected site ad revenue represents the total currency units available for distribution to authors either in points or currency units. The conversion from points to currency units may be for example two cents per point. Other compensation limitation and points-to-currency units conversion are suitable.

In another feature of the present invention, system 100 (compensation module 15 or content management subsystem 35) measures popularity of tags. This measurement is based on number of times a tag is bookmarked, and/or number of times a tag is in a comment or cited in an email message or authored work 29. System 100 employs tagging tables 126 counters, registers, bit tables and the like to track the number of users and appearances of tags or references thereof. Common methods for ranking are used to rank tags by popularity. System 100 also determines and tracks changes (increase/decrease) in rank of tags. This enables system 100 to display in some embodiments a list of tags with fastest increase in popularity and tags with fastest decline in popularity rank. System 100 may display a respective list of most popular tags for each of reading, writing or discussing as determined by reader user activity, author-user activity, and activity through communications component 33.

In another feature, where an authored work 29, bookmark, comment, etc. is being written on a client PC 50, system 100 saves to a server 60 periodically without user request to avoid the accidental erasure due to timeout, accidental closing or redirection of a browser to another page. Here, when content is typed into a Javascript or similar window, the local software 92 contacts the database 94 and records the users work either on a timed scheduled or based on the amount of content to change to avoid losing content. The automated saving means may similarly save preferences or other content expressed on a web form (such as user settings/profile 37, preferences, group settings 112, 114, 115 in FIG. 2h and other user selections throughout system 100 interface windows) to avoid marked preferences loss as well.

Further, tagging table 126 enables system 100 to identify tags or tag sets which other tags or tag sets are most commonly combined/used with. System 100 may hierarchically order the identified tags/tag sets. The publication table 124 and user tables 122 in addition enable system 100 to determine which authored works, users or groups are correlated to a subject tag or tag set.

While this invention has been particularly shown and described with references to preferred embodiments thereof, it will be understood by those skilled in the art that various changes in form and details may be made therein without departing from the scope of the invention encompassed by the appended claims.

For example, although the foregoing describes a client-server computer architecture, other configurations, data structures and architectures are suitable.

Further independent of author compensation and reader rating, features of the invention system enable users to navigate through content via a variety of methods and means. The system 100 provides user assistance through content ratings, author ratings, navigation by topic, by faceted or polymorphic search and the like. The system 100 may provide assistance by ordering authored work pieces 29 or by filtering them based on user-defined characteristics (e.g., no articles less than x characters, no authored works older than y days, etc.). The user subscriptions based on authors, topics, keywords, etc. further aids in finding desired authored pieces. Common relational query operations on the user tables 122, publication tables 124 and tagging tables 126 enable the foregoing.

The system 100 treats bookmarks, comments and tags similar to authored works 29 as far as a unit of content is concerned. Bookmarks are citations of other work (content unit) in system 100 or in the global network 70. Bookmarks may be commented on similar to how authored works 29 have comments as illustrated and discussed above in publication table 124 of FIG. 2h.

Various relational database operations and techniques may be employed to provide the above analyses, calculations and results (ordered lists) for display. Different database systems, database fields, record indexes and the like to support the foregoing invention features are suitable and in the purview of one skilled in the art given this disclosure.

What is claimed is:

1. A computer-implemented method of recording electronic traffic metrics of digital works on a global computer network, the computer-implemented method comprising:
   accepting at least one created digital work from each of a plurality of author-users;
   generating, for each created digital work, a respective created digital work record storing a view count for the associated created digital work, and an indication of the corresponding author-user of the associated created digital work;
   generating an author-user table for each author-user, each author-user table being linked to each created digital work record indicating the respective author-user and storing a popularity rating of the respective author-user based on the view count stored in each linked created digital work record;
   generating a tagging table linked to the created digital work records that stores reader-user suggested tags assigned to created digital works, the tagging table including an entry for each tag indicating a popularity rating of the tag based on the view count for each created digital work assigned the tag;
   upon a user navigating to one of the created digital works, recording electronic traffic of the user to the one created digital work by, without further human intervention, updating:
      the view count for the one created digital work stored in the respective created digital work record,
      the popularity rating of the author-user of the one created digital work based on the view count stored in each created digital work record indicating the author-user of the one created digital work including the updated view count for the one created digital work,
      the popularity rating of each tag assigned to the one created digital work selected by the user based on the updated view count for the one created digital work; and
      utilizing the created digital work records, the author-user tables and the tagging table to determine electronic traffic for each author-user and for each tag.

2. The computer-implemented method of claim 1, wherein the created digital works are associated with advertisements.

3. The computer-implemented method of claim 1, wherein the created digital work record further comprises an average rating in at least one area as determined from a plurality of rater-users, the area for rating being chosen from any combination of:
   a writing quality rating,
   a presentation rating,
   a political leaning rating,
   a suitability rating for a given audience or age group,
   a compliance rating with one or more standards,
   a factual accuracy rating,
   a uniqueness rating, and
   a quotability rating.

4. The computer-implemented method of claim 3, further comprising:
   providing a reward to one of the plurality of author-users based on at least the average rating in a created digital work record indicating the one author-user.

5. The computer-implemented method of claim 1, further comprising:
   providing a reward to at least one of the plurality of author-users based on at least the popularity rating of the at least one author-user.

6. The computer-implemented method of claim 5, wherein providing the reward comprises providing financial compensation.

7. The computer-implemented method of claim 5, wherein providing the reward to the at least one author-user is further based on advertising revenue generated by their respective created digital works.

8. The computer-implemented method of claim 5, wherein the provided reward is limited by a reward budget.

9. The computer-implemented method of claim 1, further comprising:
   providing a reward to one of the plurality of author-users based on the popularity rating of the one author-user, and providing a different reward if the popularity rating of the one author-user reaches a predefined number.

10. The computer-implemented method of claim 1, wherein the user navigates to the one created digital work by a search result list displaying an indication of the one created digital work, and upon the user selecting said indication from the search result list, recording electronic traffic of the user to the one created digital work.

11. The computer-implemented method of claim 1, further comprising:
generating, for each of a plurality of viewer-users, a viewer-user table based on created digital works viewed by each respective viewer-user.

12. A computer system for recording electronic traffic metrics of digital works, the system comprising:
a computer member configured to accept at least one created digital work from each of a plurality of author-users;
a digital work record module coupled to the computer member and configured to generate, for each created digital work, a respective created digital work record storing a view count for the associated created digital work, and an indication of the corresponding author-user of the associated created digital work;
a user table module coupled to the computer member and configured to:
generate an author-user table for each of the plurality of author-users, each author-user table being linked to each created digital work record indicating the respective author-user and storing a popularity rating of the author-user based on the view count for each linked created digital work record;
a tagging table module coupled to the computer member and configured to:
generate a tagging table linked to the created digital work records that stores tags assigned to created digital works, the tagging table including an entry for each tag indicating a popularity rating of the tag based on the view count for each created digital work assigned the tag;
an electronic traffic module coupled to the computer member and configured to:
upon a user navigating to one of the created digital works, record electronic traffic of the user to the one created digital work by, without further human intervention, updating:
the view count for the one created digital work in the respective created digital work record,
the popularity rating of the author-user of the one created digital work based on the view count stored in each created digital work record indicating the author-user of the one created digital work including the updated view count for the one created digital work,
the popularity rating of each tag assigned to the one created digital work based on the updated view count for the one created digital work; and
utilize the created digital work records, the author-user tables and the tagging table to determine electronic traffic for each author-user and for each tag.

13. The computer system of claim 12, wherein the created digital works are associated with advertisements.

14. The computer system of claim 12, wherein the created digital work record further comprises an average rating in at least one area as determined from a plurality of rater-users, the area for rating being chosen from any combination of:
a writing quality rating,
a presentation rating,
a political leaning rating,
a suitability rating for a given audience or age group,
a compliance rating with one or more standards,
a factual accuracy rating,
a uniqueness rating, and
a quotability rating.

15. The computer system of claim 14, further comprising:
a compensation module coupled to the computer member and configured to provide a reward to one of the plurality of author-users based on at least the average rating in a created digital work record indicating the one author-user.

16. The computer system of claim 12, further comprising:
a compensation module coupled to the computer member and configured to provide a reward to at least one of the plurality of author-users based on at least the popularity rating of the at least one author-user.

17. The computer system of claim 16, wherein the compensation module is configured to provide financial compensation.

18. The computer system of claim 16 wherein the compensation module is configured to provide rewards to the plurality of author-users based further on advertising revenue generated by their respective created digital works.

19. The computer system of claim 16, wherein the provided reward is limited by a reward budget.

20. The computer system of claim 12, further comprising:
a compensation module coupled to the computer member and configured to:
provide a reward to one of the plurality of author-users based on the popularity rating of the one author-user, and provide a different reward if the popularity rating of the one author-user reaches a predefined number.

21. The computer system of claim 12, wherein the user navigates to the one created digital work by a search result list displaying an indication of the one created digital work, and upon the user selecting said indication from the search result list, recording electronic traffic of the user to the one created digital work.

22. The computer system of claim 12, wherein the user table module is further configured to:
generate, for each of a plurality of viewer-users, a viewer-user table based on created digital works viewed by each respective viewer-user.

\* \* \* \* \*